(12) United States Patent
Gehring

(10) Patent No.: US 10,975,832 B2
(45) Date of Patent: Apr. 13, 2021

(54) WATER CURRENT CATCHER SYSTEM FOR HYDROELECTRICITY GENERATION

(71) Applicant: Donald Hollis Gehring, Houston, TX (US)

(72) Inventor: Donald Hollis Gehring, Houston, TX (US)

( * ) Notice: Subject to any disclaimer, the term of this patent is extended or adjusted under 35 U.S.C. 154(b) by 0 days.

(21) Appl. No.: 16/411,987

(22) Filed: May 14, 2019

(65) Prior Publication Data

US 2019/0264648 A1 Aug. 29, 2019

Related U.S. Application Data

(63) Continuation-in-part of application No. 15/997,517, filed on Jun. 4, 2018, now Pat. No. 10,422,311.

(60) Provisional application No. 62/514,625, filed on Jun. 2, 2017.

(51) Int. Cl.
  *F03B 13/10* (2006.01)
  *F03B 17/06* (2006.01)
  *F03B 13/26* (2006.01)

(52) U.S. Cl.
  CPC ............ *F03B 13/10* (2013.01); *F03B 13/264* (2013.01); *F03B 17/063* (2013.01); *F05B 2240/302* (2013.01); *F05B 2240/915* (2013.01); *F05B 2240/97* (2013.01)

(58) Field of Classification Search
  CPC ..................................................... F03B 13/10
  USPC ....................................... 290/53, 54; 405/79
  See application file for complete search history.

(56) References Cited

U.S. PATENT DOCUMENTS

| 525,130 | A | * | 8/1894 | Boyd | F03B 17/063 |
| | | | | | 416/85 |
| 2,097,286 | A | * | 10/1937 | McGee | E03B 9/00 |
| | | | | | 290/54 |
| 4,001,596 | A | * | 1/1977 | Kurtzbein | F03B 13/145 |
| | | | | | 290/53 |
| 4,023,041 | A | * | 5/1977 | Chappell | F03B 13/184 |
| | | | | | 290/53 |

(Continued)

FOREIGN PATENT DOCUMENTS

| CN | 104564504 | 8/2016 |
| JP | 5875722 | 3/2016 |

(Continued)

*Primary Examiner* — Pedro J Cuevas

(57) ABSTRACT

A water current catcher system for hydroelectricity generation includes a first L-shaped weir, a second L-shaped weir, a channel opening, an underwater gate assembly, and at least one elevation adjustable hydroelectric generator unit. The first and second L-shaped weir are connected to a subsurface environment and linearly positioned to each other. The channel opening is delineated between the first L-shaped weir and the second L-shaped weir. The underwater gate assembly is integrated into the first L-shaped weir, the second L-shaped weir, and the subsurface environment thus positioning about the channel opening. The elevation adjustable hydroelectric generator unit that includes a first jack-up barge, a second jack-up barge, a waterwheel, and a generator is connected to the subsurface environment and adjacently positioned about the channel opening. The elevation adjustable hydroelectric generator unit is operatively coupled with the underwater gate assembly to convert the kinetic energy of flowing water into hydroelectricity.

12 Claims, 20 Drawing Sheets

(56) References Cited

U.S. PATENT DOCUMENTS

| | | | | |
|---|---|---|---|---|
| 4,241,283 A * | 12/1980 | Storer, Sr. | ................ | E02B 9/04 290/43 |
| 4,276,481 A * | 6/1981 | Parker | ................ | F03B 17/065 290/43 |
| 4,383,797 A * | 5/1983 | Lee | ................ | F03B 17/062 405/22 |
| 4,516,033 A | 5/1985 | Olson | | |
| 4,717,831 A * | 1/1988 | Kikuchi | ................ | F03B 13/184 290/53 |
| 4,843,249 A * | 6/1989 | Bussiere | ................ | F03B 13/183 290/42 |
| 5,136,174 A | 8/1992 | Simoni | | |
| 5,430,332 A * | 7/1995 | Dunn, Jr. | ................ | F03B 7/00 290/43 |
| 5,440,175 A * | 8/1995 | Mayo, Jr. | ................ | F03B 7/003 290/53 |
| 5,882,143 A * | 3/1999 | Williams, Jr. | ................ | E02B 9/00 290/53 |
| 6,208,037 B1 * | 3/2001 | Mayo, Jr. | ................ | E02B 9/00 290/42 |
| 6,499,939 B2 * | 12/2002 | Downing | ................ | F03B 17/065 415/3.1 |
| 6,629,803 B1 * | 10/2003 | McFarland | ................ | A63G 3/02 405/79 |
| 6,930,406 B2 * | 8/2005 | Montgomery | ................ | F03B 13/1845 290/42 |
| 6,932,541 B2 * | 8/2005 | McFarland | ................ | A63G 3/02 405/79 |
| 7,270,513 B2 * | 9/2007 | Regan | ................ | F03B 17/062 415/121.2 |
| 7,326,001 B2 * | 2/2008 | McFarland | ................ | A63G 3/00 405/79 |
| 7,785,065 B2 | 8/2010 | Clemens | | |
| 7,855,468 B2 * | 12/2010 | Lin | ................ | F03B 17/065 290/43 |
| 7,969,034 B2 | 6/2011 | Winius | | |
| 8,120,196 B1 * | 2/2012 | Neese | ................ | F03B 13/183 290/53 |
| 8,152,441 B2 * | 4/2012 | Hofmann | ................ | F03B 17/065 415/173.2 |
| 8,497,594 B2 * | 7/2013 | Rajadhyaksha | ................ | F03B 17/063 290/53 |
| 8,525,363 B2 * | 9/2013 | Rajadhyaksha | ................ | F03B 17/062 290/53 |
| 8,573,890 B2 | 11/2013 | Gehring | | |
| 8,602,685 B1 * | 12/2013 | McFarland | ................ | A63B 69/0093 405/79 |
| 8,622,651 B2 * | 1/2014 | McFarland | ................ | E04H 4/0006 405/79 |
| 8,643,206 B2 * | 2/2014 | Ekern | ................ | F03B 13/06 290/52 |
| 8,786,122 B2 * | 7/2014 | Rajadhyaksha | ................ | F03B 17/063 290/53 |
| 8,823,196 B1 | 9/2014 | Gehring | | |
| 8,841,793 B2 * | 9/2014 | Wang | ................ | F03B 13/10 290/43 |
| 8,890,353 B2 | 11/2014 | Cunnane | | |
| 8,943,821 B2 | 2/2015 | Hagemann et al. | | |
| 8,956,103 B2 | 2/2015 | Gehring | | |
| 8,957,541 B1 * | 2/2015 | Jacobsen | ................ | F03B 13/00 290/54 |
| 9,068,371 B2 * | 6/2015 | McFarland | ................ | E04H 4/0006 |
| 9,534,579 B2 | 1/2017 | Van Rompay | | |
| 9,581,127 B2 * | 2/2017 | Van Rompay | ................ | F03B 13/10 |
| 10,422,311 B2 * | 9/2019 | Gehring | ................ | F03B 17/063 |
| RE48,000 E * | 5/2020 | McFarland | ................ | E04H 4/0006 |
| 10,666,174 B2 * | 5/2020 | Bergman | ................ | H02P 9/04 |
| 2003/0004003 A1 * | 1/2003 | Lochtefeld | ................ | A63B 71/0054 472/117 |
| 2003/0198515 A1 * | 10/2003 | McFarland | ................ | A63G 3/02 405/79 |
| 2005/0017513 A1 * | 1/2005 | Sipp | ................ | F03B 17/063 290/54 |
| 2008/0309089 A1 * | 12/2008 | Lin | ................ | F03B 17/065 290/54 |
| 2010/0135727 A1 * | 6/2010 | McFarland | ................ | A63G 31/007 405/79 |
| 2012/0019004 A1 * | 1/2012 | Ekern | ................ | F03B 13/06 290/53 |
| 2013/0220940 A1 * | 8/2013 | Galletta | ................ | C02F 1/74 210/747.6 |
| 2013/0229014 A1 * | 9/2013 | Willingham | ................ | F03B 13/10 290/54 |
| 2013/0241206 A1 * | 9/2013 | Tkadlec | ................ | H02K 49/102 290/54 |
| 2013/0285383 A1 * | 10/2013 | Belarbi | ................ | F03B 17/063 290/54 |
| 2013/0313833 A1 * | 11/2013 | Bang | ................ | F03B 17/063 290/54 |
| 2013/0322967 A1 * | 12/2013 | McFarland | ................ | A63B 69/0093 405/79 |
| 2014/0105685 A1 * | 4/2014 | McFarland | ................ | E04H 4/0006 405/79 |
| 2018/0347538 A1 * | 12/2018 | Gehring | ................ | F03B 7/00 |

FOREIGN PATENT DOCUMENTS

| | | |
|---|---|---|
| KR | 10-1543995 | 8/2015 |
| TW | I500556 | 9/2015 |

* cited by examiner

WATER CURRENT CATCHER SYSTEM FOR HYDROELECTRICITY GENERATION

The current application is a continuation-in-part (CIP) application of the U.S. non-provisional application Ser. No. 15/997,517 filed on Jun. 4, 2018. The U.S. non-provisional application Ser. No. 15/997,517 claims a priority to a U.S. provisional application Ser. No. 62/514,625 filed on Jun. 2, 2017.

FIELD OF THE INVENTION

The present invention relates generally to hydro-power generation. More specifically, the present invention utilizes a height adjustable waterwheel and highly efficient low revolution per minute generator to convert the kinetic energy of flowing water into electrical energy.

BACKGROUND OF THE INVENTION

Waterwheels:

For hundreds of years and before the advent of modern dams and associated very large water reservoirs, the power of flowing water was harnessed by a waterwheel. Most waterwheels were a relatively simple, relatively low cost, normally only used a portion of the river's flow and were usually located near one bank of the river and turned a machine located on the bank of the river or stream with some sort of mechanical drive system. These waterwheels did not require the purchase in thousands of acres of land, did not require a significant amount of land to be cleared and flooded, and did not require deep-water reservoirs. These waterwheels were commonly located in a high flow rate location along a riverbank near natural river elevation changes. Developers often increased the river's flow rate near the waterwheel by building weirs across the river that raised the elevation of the river to divert the water to the waterwheel, to increase the amount of water to the waterwheel, and to increase the velocity of the river's flow across the waterwheel's paddles with minimum expense and without buying and flooding significant acreages of land. The investment in the weir was usually small compared to our current day costs to build a large modern dams and associated reservoirs. These weirs would usually raise the water level slightly creating a small lake upstream of the weir. These lakes generally provide as a recreational area for boating, fishing, and other water related activities. Today's available construction equipment and construction techniques have lowered weir construction costs significantly.

The Old Waterwheels:
- were sometimes large in diameter compared to their width.
- were usually narrow compared to their diameter
- often had closely spaced paddles with small areas
- often had paddles that were in the shadow of the previous paddle
- often had paddles that served more as water holders for gravity to turn the waterwheel rather than flowing water pressure turning the waterwheel.
- often harnessed only a small portion the river or stream's flow for power.
- were often located in relatively small streams avoiding flood water damage.
- produced relatively small torque, but adequate for grinding grain, crushing grapes, pumping water, turning belts, sawing logs, etc.
- were low RPM devices.
- were not able to move up and down with varying water levels to avoid flood water damage.
- were usually unable to take full advantage of the higher river flow rates since they had a fixed elevation.
- were usually unable to avoid high flood water damage.
- often faced significant mechanical losses when using gears to transfer torque.
- lowest paddles were often submerged in the stationary water below the weir resulting in significant drag and resistance to turning the paddle wheel.
- were not able to transfer their produced power much beyond the banks of the rivers limiting use of the power to near the water's edge.
- were gradually replaced by the stream engines which could provide power anywhere, even for moving objects such as trains, tractors, ships, etc. The steam engines were later replaced by even more compact and lighter internal combustion engines and electric motors.

For the purpose of size comparison, the two 26-foot (7.9-m) diameter side waterwheels on the SS California, Pacific Mail's first ship running from Panama City to San Francisco, were powered by a large one-cylinder side-lever engine built by Novelty Iron Works of New York City. The engine's cylinder bore was about 75 inches (190 cm) in diameter with a stroke of 8 feet (2.4 m). The engine turned the two side waterwheels at about 13 revolutions per minute, driving the ship at about eight knots, with 14 knots possible under good conditions. She carried about 520 tons of coal.

Dams, Reservoirs, Water Storage, and Hydro-Electric Power Generation Projects:

A large percentage of today's power is supplied through hydro-electric power which is mainly obtained from large government supported multi-purpose water storage and power generation facilities. However, the percentage of today's power supplied by hydro-electric power is declining and more power is being supplied by other forms of power generations such as wind and solar power. Many old reservoirs today have very low water levels because rainwater is low, and the water is needed for other purposes than power generation. As water levels decline, the head pressures on the turbines also declines along with the power outputs.

Large dams have been built to create large reservoirs, and relatively small pipes passing through the dams to deliver high pressure and high velocity water to turn relatively small high drag coefficient high tolerance confined turbines that turn relatively small and relatively low cost but very powerful high RPM generators. The high RPM turbines are usually connected directly to the high RPM generators. Power generation can remain fairly constant when the reservoir level remains fairly constant. For the reservoir to remain at a fairly constant level, the water removal must roughly equal the water entering the reservoir. Since river, stream and tidal flow rates and water levels vary over time, it is difficult to maintain constant power production. Large reservoirs often reduce power generation to maintain water levels.

Hydro-electric projects are often made possible when the reservoirs are located in remote areas where much of the needed reservoir land may still be owned by the government and when the government exercises its right of immanent domain to buy the large acreages of land from private landowners needed for the reservoirs. New hydroelectric reservoir/power plant projects are fewer today in many parts of the developed world due to high cost of the projects compared to other new power plant alternatives, the increased regulations, increased environmental impact concerns, increased land costs, and increased competition from other viable low LCOE power plants, like wind, solar, gas, etc. The biggest hurdle of the new hydroelectric reservoir/power plant projects can largely be attributed directly or indirectly to the significant amount of land that needs to be purchased and flooded to raise the water levels of the rivers to create the high water pressure jets needed for high RPM turbines and generators.

Today, some hydroelectric reservoir/power plants are taking on the new role of surplus power storage and the surplus power is largely coming from the growing number of renewable energy power plants like wind, solar, etc. The surplus power is being used to pump water from lower level reservoirs to higher level reservoirs equipped with hydroelectric power generation facilities. When the wind speeds are low and when the sun is not shining, the stored water in the hydro-electric power plant reservoirs is used to generate electricity. Other forms of power storage are also being used but hydroelectric storage is the most common and the lowest cost.

It is an objective of the present invention to provide a system which uses the normal river flow to provide sustained power eliminating the need to purchase and flood large areas of land, which is one of the biggest hurdles facing new hydro-electric power plant/reservoir projects. More specifically, streams/rivers undergo many elevations changes along their route to the sea and only a few of the elevation change locations along these waterways have been used for power generation. Many more changes in water level locations can still be used and, in the process, deliver significant additional power to the grid. The present invention allows small low costs weir type reservoirs to be built at numerous locations along these waterways. These small reservoirs can generate significant power at very low cost and with minimum negative impact thanks to the elimination of the need to flood large areas of land to create large reservoirs. The present invention also uses numerous small reservoirs to generate similar amounts of power to large reservoirs and in the process increase: the fish population, wildlife, drinking water supplies, water tables, etc. The present invention uses large diameter waterwheels with high drag coefficient paddles to drive low RPM electric generators that can supply power to remote users thousands of miles away. The paddles of the waterwheel are operated in confined close tolerance channels with minimum flowing water energy losses. The torque produced by the flowing water pressure on these paddles is high enough to turn the new low torque high power output wind turbine type generators at their capacity. The generators can either be turned directly or through the use of a gear box. The waterwheels and their generators are sized for the individual water resource opportunities. The present invention can optionally employee a means of adjusting the elevation of the waterwheel to match the changing river water levels allowing the waterwheel to be at its optimum elevation for maximum power generation at all river stages and to avoid floodwater damage. The present invention can also be used for both uni-directional upstream to downstream river flow applications and for bi-directional tidal applications.

DETAIL DESCRIPTIONS OF THE INVENTION

All illustrations of the drawings are for the purpose of describing selected versions of the present invention and are not intended to limit the scope of the present invention.

The present invention is a hydroelectricity generating unit that captures water current energy from river currents, tidal estuary currents or from streams. More specifically, the present invention converts water current into the hydroelectricity, as the generated electricity from the present invention can be exported into an electrical substation or an electrical distribution center through at least one electrical cable. The present invention is integrated onto a subsurface environment 48 so that the present invention is able to efficiently capture the water current, wherein the subsurface environment 48 can be a riverbed, a subsurface structure, or any other underwater surface. The present invention is built across a flowing body of water whose water is forced to flow through a relatively narrow channel opening in a weir so that most of the flowing water can be forced to operatively rotate a waterwheel-generator system to generate electricity. A control and monitoring facility can be located adjacent to the present invention or located remotely.

Figure 1:
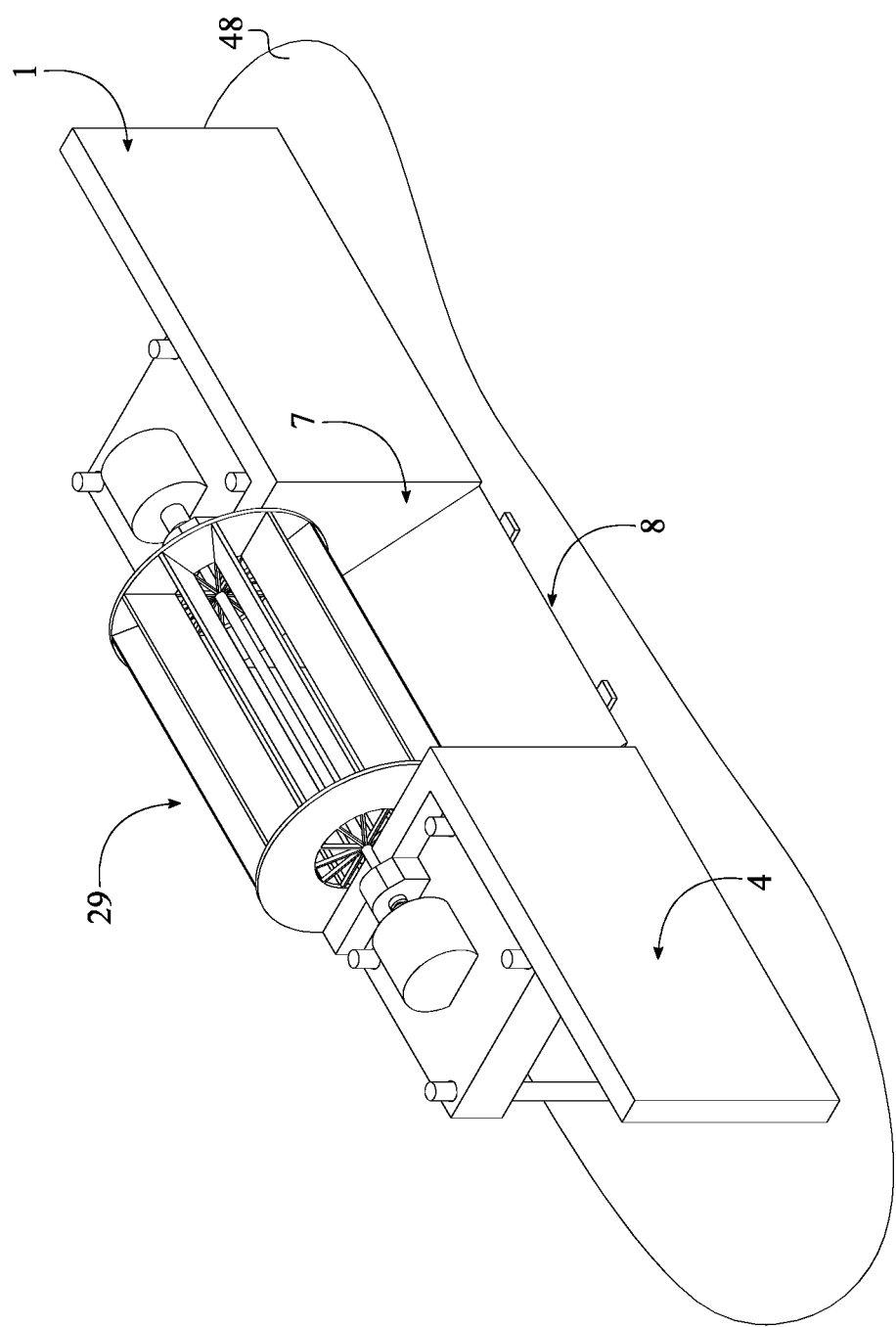
FIG. 1 is a perspective view of the present invention without the weir supported bridge and the channel support and bridge.
Figure 2:
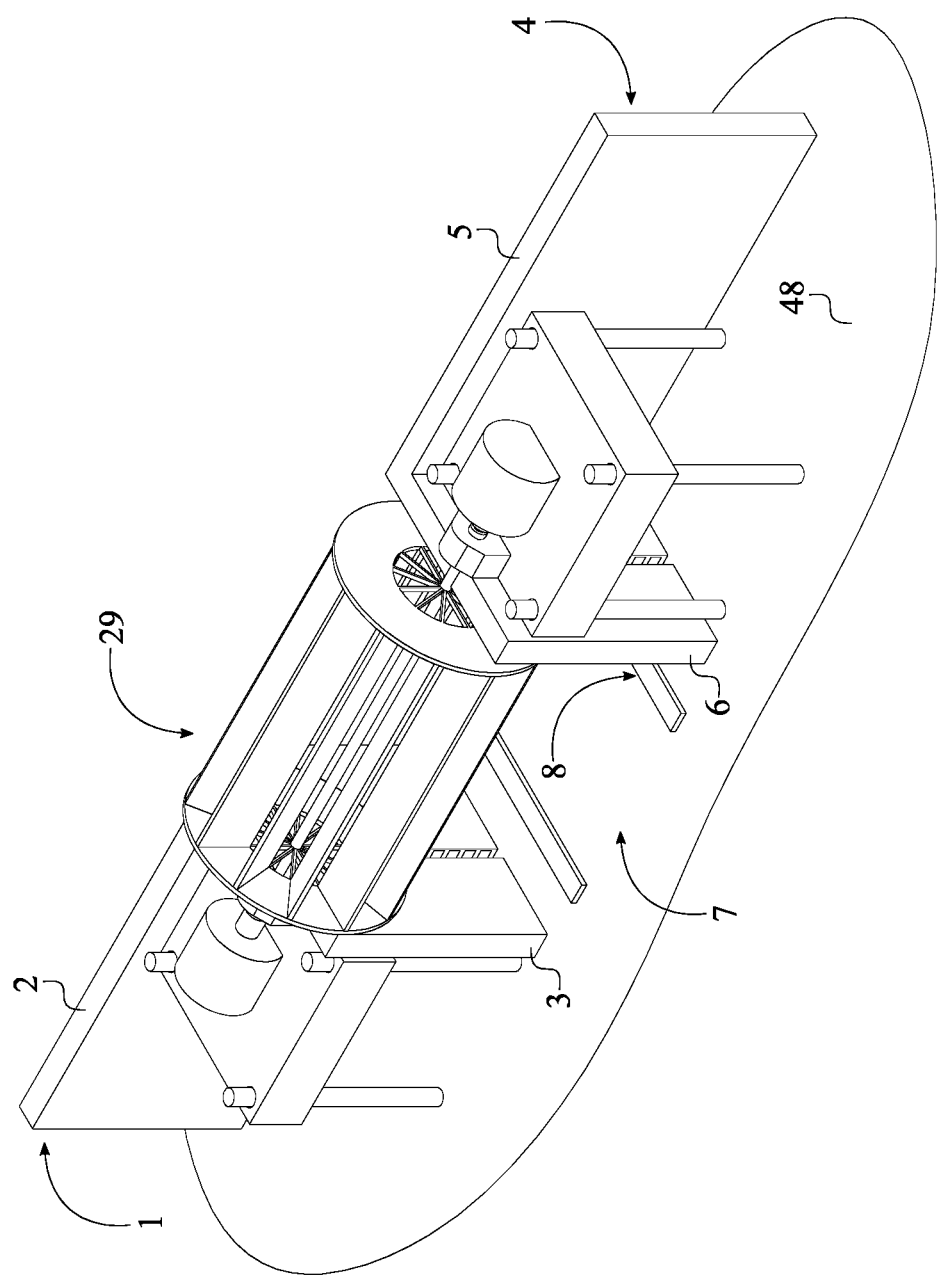
FIG. 2 is another perspective view of the present invention without the weir supported bridge and the channel support and bridge.

The present invention comprises a first L-shaped weir 1, a second L-shaped weir 4, a channel opening 7, an underwater gate assembly 8, and at least one elevation adjustable hydroelectric generator unit 29 as shown in FIG. 1-2. In reference to the general configuration of the present invention, the first L-shaped weir 1 and the second L-shaped weir 4 that raise the level of water upstream and regulate the water flow are connected to the subsurface environment 48. In order to equally absorb the weight of the body of water, the first L-shaped weir 1 and the second L-shaped weir 4 are linearly positioned adjacent to each other. The channel opening 7 is delineated in between the first L-shaped weir 1 and the second L-shaped weir 4 so that the water flow can be guided into the channel opening 7 along the first L-shaped weir 1 and the second L-shaped weir 4. The underwater gate assembly 8 is integrated into the first L-shaped weir 1, the second L-shaped weir 4, and the subsurface environment 48. Furthermore, the underwater gate assembly 8 extends across the channel opening 7 to control the velocity of the water flow as the body of water discharges through the channel opening 7. The elevation adjustable hydroelectric generator unit 29 that converts the kinetic energy of the water flow to hydroelectricity is connected to the subsurface environment 48 and mounted in between the first L-shaped weir 1 and the second L-shaped weir 4. Additionally, the elevation adjustable hydroelectric generator unit 29 is operatively coupled with the underwater gate assembly 8 so that the elevation adjustable hydroelectric generator unit 29 can maximize the conversion of the kinetic energy of the water flow to hydroelectricity during all water level changes and raise the elevation adjustable hydroelectric generator unit 29 above the flood water levels protecting the structural integrity and functionality of the present invention. The present invention also utilizes the installation of scour protection around the high flow velocity areas like the first L-shaped weir 1, the second L-shaped weir 4, the channel opening 7, overflow spillway areas, etc. to prevent erosion and undermining.

The first L-shaped weir 1 and the second L-shaped weir 4 are similar in shape to each other as the channel opening 7 is positioned in between the first L-shaped weir 1 and the second L-shaped weir 4. Furthermore, the first L-shaped weir 1 and the second L-shaped weir 4 are connected onto the subsurface environment 48, wherein the height of the first L-shaped weir 1 and the second L-shaped weir 4 raise above the body of water. In reference to FIG. 1-3, the first L-shaped weir 1 comprises a first weir wall 2 and a first channel wall 3. The second L-shaped weir 4 comprises a second weir wall 5 and a second channel wall 6. The first weir wall 2 and the first channel wall 3 are terminally connected to each other thus delineating the L-shaped profile. Similarly, the second weir wall 5 and the second channel wall 6 are terminally connected to each other thus delineating the L-shaped profile. The first weir wall 2 and the second weir wall 5 are positioned coplanar to each other and distributed across the body of water, wherein the first weir wall 2 and the second weir wall 5 are the long legs of the L-shaped profile. As a result, the first weir wall 2 and the second weir wall 5 perpendicularly intercept the water flow so that the velocity of the water flow can be decreased about the first weir wall 2 and the second weir wall 5. The first channel wall 3 and the second channel wall 6 are positioned parallel to each other, wherein the first channel wall 3 and the second channel wall 6 are the short legs of the L-shaped profile. In comparison to a dam, the first L-shaped weir 1 and the second L-shaped weir 4 perform efficient within the present invention as flood water can be spilled over the first L-shaped weir 1 and the second L-shaped weir 4 thus relieving excess water pressure that can be damaging the structural integrity of the present invention. Additionally, the first L-shaped weir 1 and the second L-shaped weir 4 are also able to maintain a lower manufacturing cost in comparison to a manufacturing cost of a dam.

Figure 5:
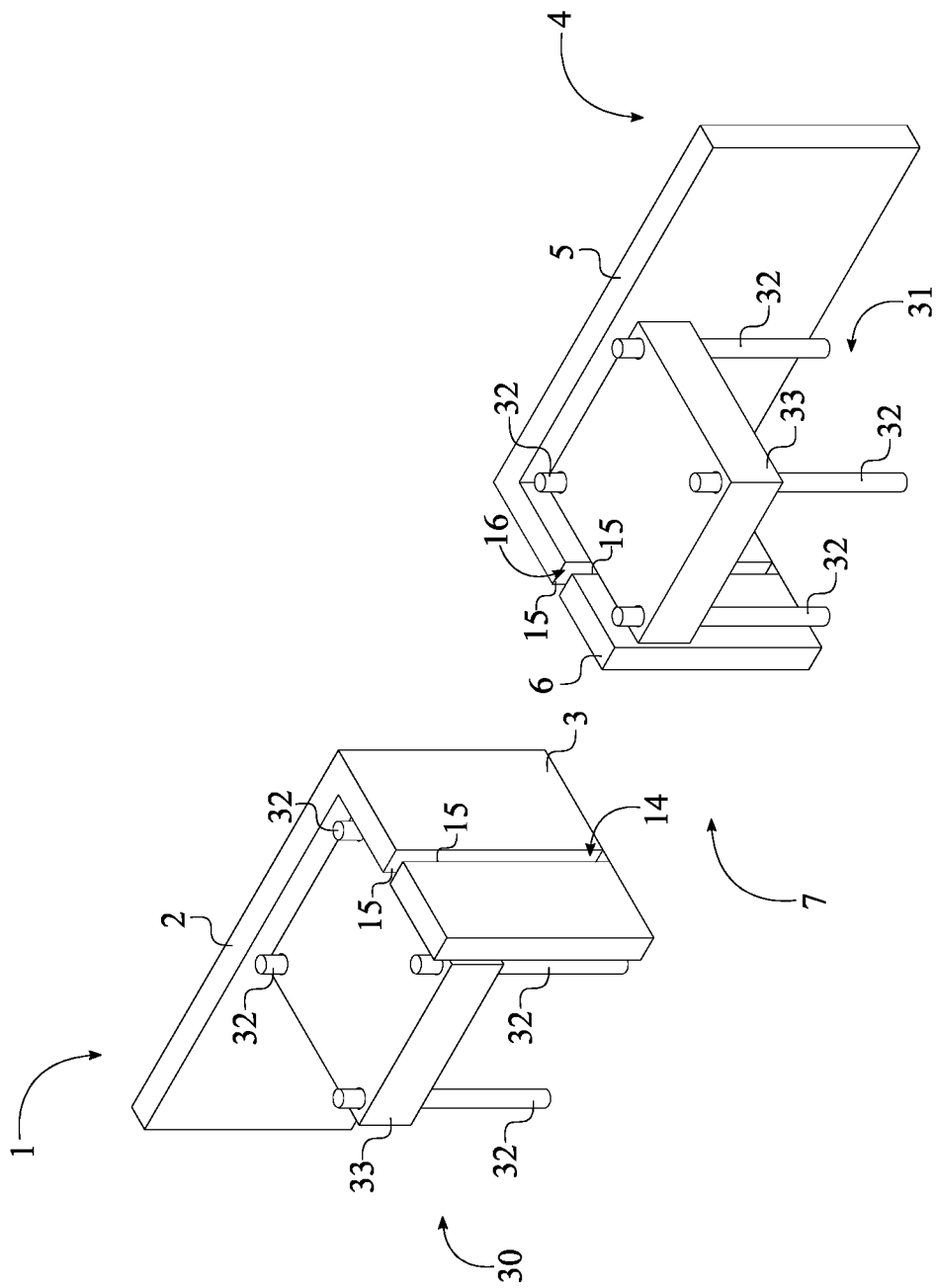
FIG. 5 is a perspective view of the first L-shaped weir, the second L-shaped weir, the first jack-up barge, and the second jack-up barge of the present invention.
Figure 6:
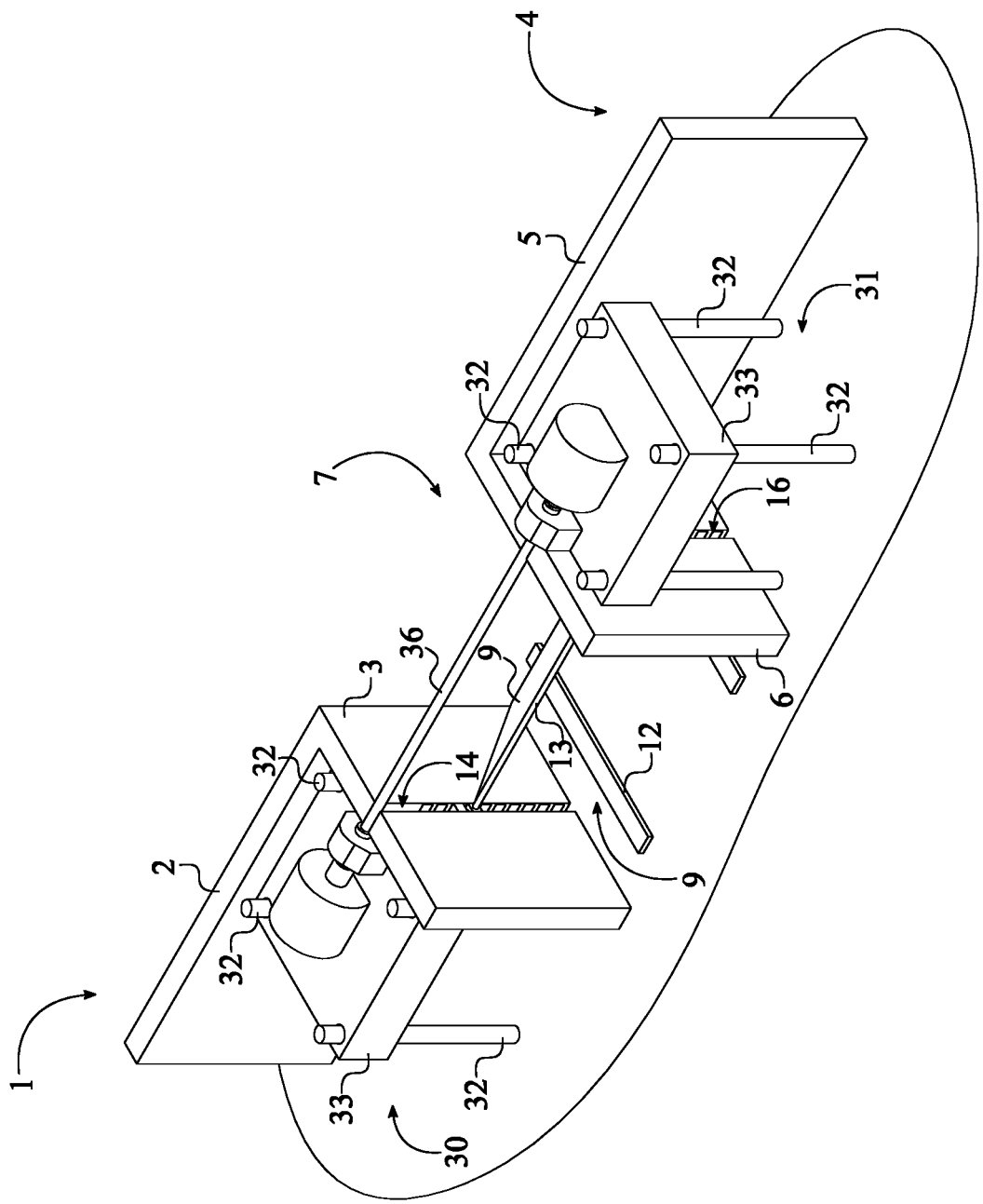
FIG. 6 is a perspective view of the first L-shaped weir, the second L-shaped weir, the first jack-up barge, and the second jack-up barge, and the underwater gate assembly of the present invention.

In reference to FIG. 2 and FIG. 5-6, the channel opening 7 is delineated in between the first channel wall 3 and the second channel wall 6 so that the water flow can be discharged downstream to initiate operation of the elevation adjustable hydroelectric generator unit 29. However, the channel opening 7 can also allow fish and mammals to cross the first L-shaped weir 1, the second L-shaped weir 4, and under a waterwheel 35 of the elevation adjustable hydroelectric generator unit 29. Locks and fish ladders can also be used to allow fish and boats to cross the first L-shaped weir 1 and the second L-shaped weir 4. Due to the blockage of the water flow by the first L-shaped weir 1 and the second L-shaped weir 4, the velocity of the water flow within the channel opening 7 is greatly increased within the present invention. Furthermore, the channel opening 7 is configured with sufficient depth and width so that the elevation adjustable hydroelectric generator unit 29 can harness all or most of the energy from the water flow during most water level changes.

Figure 7:
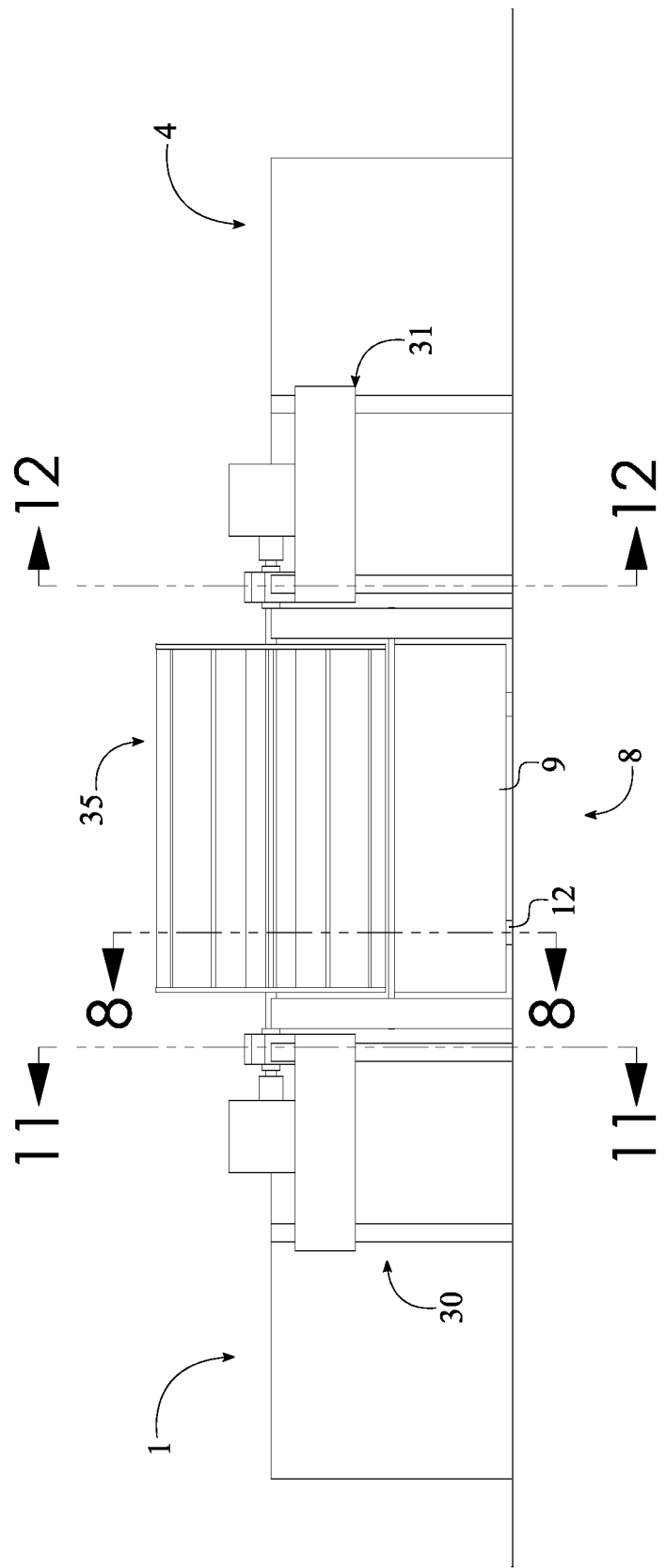
FIG. 7 is a side view of the present invention, showing the plane upon which a cross sectional view is taken shown in FIG. 8, FIG. 11, and FIG. 12.

The underwater gate assembly 8 horizontally moves along the subsurface environment 48 and vertically moves along the first channel wall 3 and the second channel wall 6 so that the channel opening 7 can be fully closed or fully opened when necessary. In reference to FIG. 6-8, the underwater gate assembly 8 comprises at least one gate 9, a track system 12, a gate hinge 13, a first vertical slot 14, a second vertical slot 16, a first gate operational mechanism 18, and a second gate operational mechanism 19. The gate 9 is preferably a rectangular shaped body that can selectively open and close within the channel opening 7 so that the water flow can be regulated. The gate hinge 13 is rotatably connected to a top end 10 of the gate 9 so that the gate 9 can be vertically moved up and down about the gate hinge 13. The track system 12 is connected to the subsurface environment 48 and functions as a sliding platform so that the gate 9 can be horizontally moved back and forth along the track system 12. More specifically, a bottom end 11 of the gate 9 is slidably engaged with the track system 12 and positioned opposite of the subsurface environment 48 so that the track system 12 can function as an anti-uplifting track system 12 to prevent the bottom end 11 from up-lifting. Furthermore, the gate hinge 13 and the track system 12 collectively protect and structurally strengthen the gate 9 against the velocity of the water flow. The first vertical slot 14 and the second vertical slot 16 respectively provide necessary channels/openings within the first channel wall 3 and the second channel wall 6 so that the gate hinge 13 can be supported vertically and horizontally and allowed to move up and down. More specifically, the first vertical slot 14 traverses through the first channel wall 3 of the first L-shaped weir 1 and is oriented parallel to the first weir wall 2 of the first L-shaped weir 1. The second vertical slot 16 traverses through the second channel wall 6 of the second L-shaped weir 4 and is oriented parallel to the second weir wall 5 of the second L-shaped weir 4. The gate hinge 13 is then able to slidably engage within the first vertical slot 14 and the second vertical slot 16, which is positioned parallel to each other, thus enabling the vertical movement of the gate 9.

Figure 9:
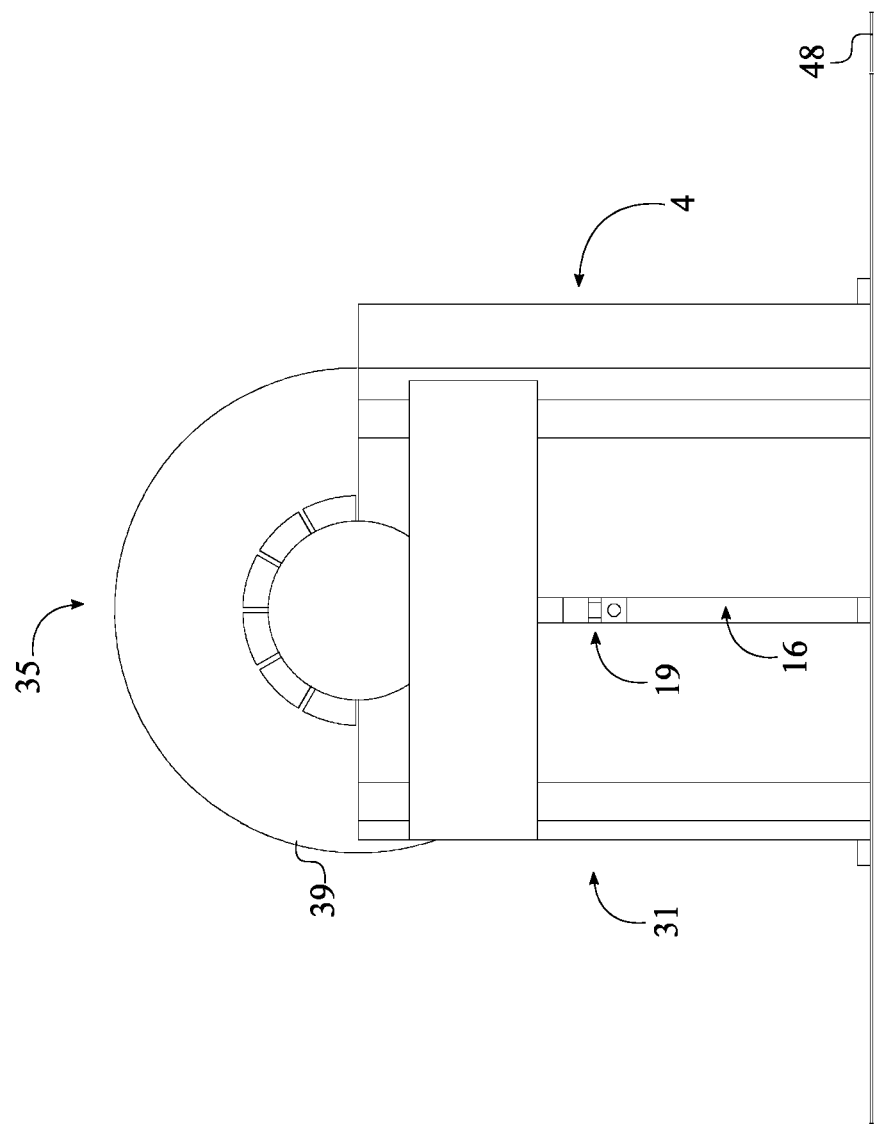
FIG. 9 is a side view of the present invention without the weir supported bridge and the channel support and bridge, showing the first embodiment of the second gate operational mechanism adjacent to the second L-shaped weir.
Figure 10:
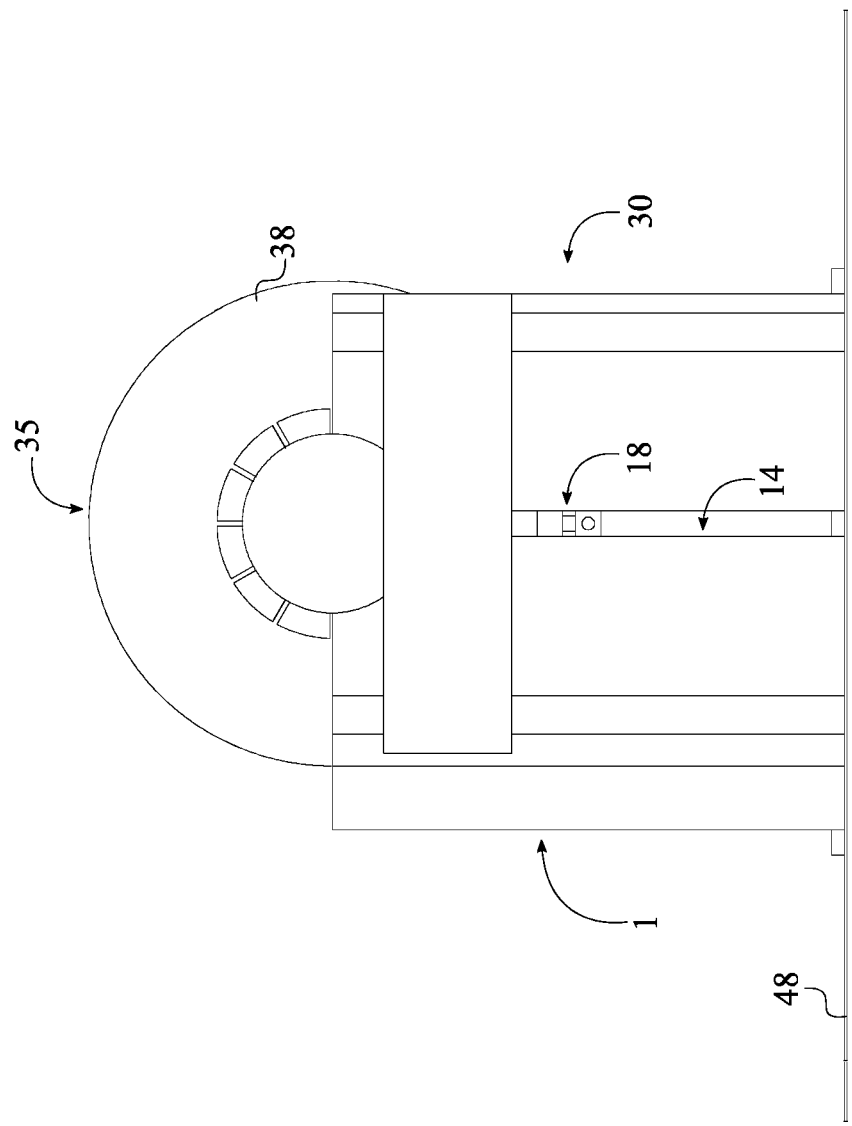
FIG. 10 is a side view of the present invention without the weir supported bridge and the channel support and bridge, showing the first embodiment of the first gate operational mechanism adjacent to the first L-shaped weir.

In reference to FIG. 9-10, the first gate operational mechanism 18 is positioned adjacent to the first vertical slot 14 and enables the vertical and restricts the horizontal and transverse movement of the gate 9 about the first channel wall 3. The second gate operational mechanism 19 is positioned adjacent to the second vertical slot 16 and enables the vertical and horizontal movement of the gate 9 about the second channel wall 6. More specifically, an end of the gate hinge 13 is operatively coupled with the first gate operational mechanism 18 so that the top end 10 of the gate 9 is able to vertically move up and down along the first vertical slot 14 while the bottom end 11 of the gate 9 is able to horizontally move back and forth along the track system 12 through the operation of the first gate operational mechanism 18. Similarly, an opposite end of the gate hinge 13 is operatively coupled with the second gate operational mechanism 19 so that the top end 10 of the gate 9 is able to vertically move up and down along the second vertical slot 16 while the bottom end 11 of the gate 9 is able to horizontally move back and forth along the track system 12 through the operation of the second gate operational mechanism 19. Depending upon different embodiment of the present invention, the first gate operational mechanism 18 and the second gate operational mechanism 19 can differ based on cost of manufacturing, surround environmental elements, and the subsurface environment 48. Furthermore, the first gate operational mechanism 18 and the second gate operational mechanism 19 can protect the gate 9 from storm water damage or excessive water flow that can be damaging to the present invention. For example, the first gate operational mechanism 18 and the second gate operational mechanism 19 can lower the gate 9 against the subsurface environment 48 so that excessive water flow or storm water can freely discharge through the channel opening 7 without having to intersect the gate 9.

A first embodiment of the first gate operational mechanism 18 and the second gate operational mechanism 19 are supported in a similar manner to the continuous jacking systems used on jack-up barge legs. The first embodiment of the first gate operational mechanism 18 and the second gate operational mechanism 19 are supported and function independently from the operation of the elevation adjustable hydroelectric generator unit 29. In reference to FIG. 7, FIG. 9, and FIG. 10-12, the first embodiment of the first gate operational mechanism 18 and the second gate operational mechanism 19 each comprises an upper slide block 20, a lower slide block 21, an upper retractable pin assembly 22, a lower retractable pin assembly 23, at least one hydraulic jack 24, a plurality of left locking keys 25, and a plurality of right locking keys 26. More specifically, the lower slide block 21 and the upper slide block 20 for the first gate operational mechanism 18 are slidably engaged within the first vertical slot 14. The lower slide block 21 and the upper slide block 20 for the second gate operational mechanism 19 are slidably engaged within the second vertical slot 16. As a result, the lower slide block 21 and the upper slide block 20 are able to vertically move up and down thus translating those vertical movements to the gate 9 about the first gate operational mechanism 18 and the second gate operational mechanism 19. In other words, the gate hinge 13 is rotatably connected within the lower slide block 21 of the first gate operational mechanism 18 and the lower slide block 21 of the second gate operational mechanism 19 so that the top end 10 of the gate 9 can vertically move up and down. The plurality of left locking keys 25 and the plurality of right locking keys 26 of the first gate operational mechanism 18 are integrated into opposing walls 15 of the first vertical slot 14. Resultantly, the lower slide block 21 and the upper slide block 20 of the first gate operational mechanism 18 are able to selectively engage with the plurality of left locking keys 25 and the plurality of right locking keys 26 of the first gate operational mechanism 18. The plurality of left locking keys 25 and the plurality of right locking keys 26 of the second gate operational mechanism 19 are integrated into opposing walls 15 of the second vertical slot 16. Resultantly, the lower slide block 21 and the upper slide block 20 of the second gate operational mechanism 19 are able to selectively engage with the plurality of left locking keys 25 and the plurality of right locking keys 26 of the second gate operational mechanism 19.

Figure 11:
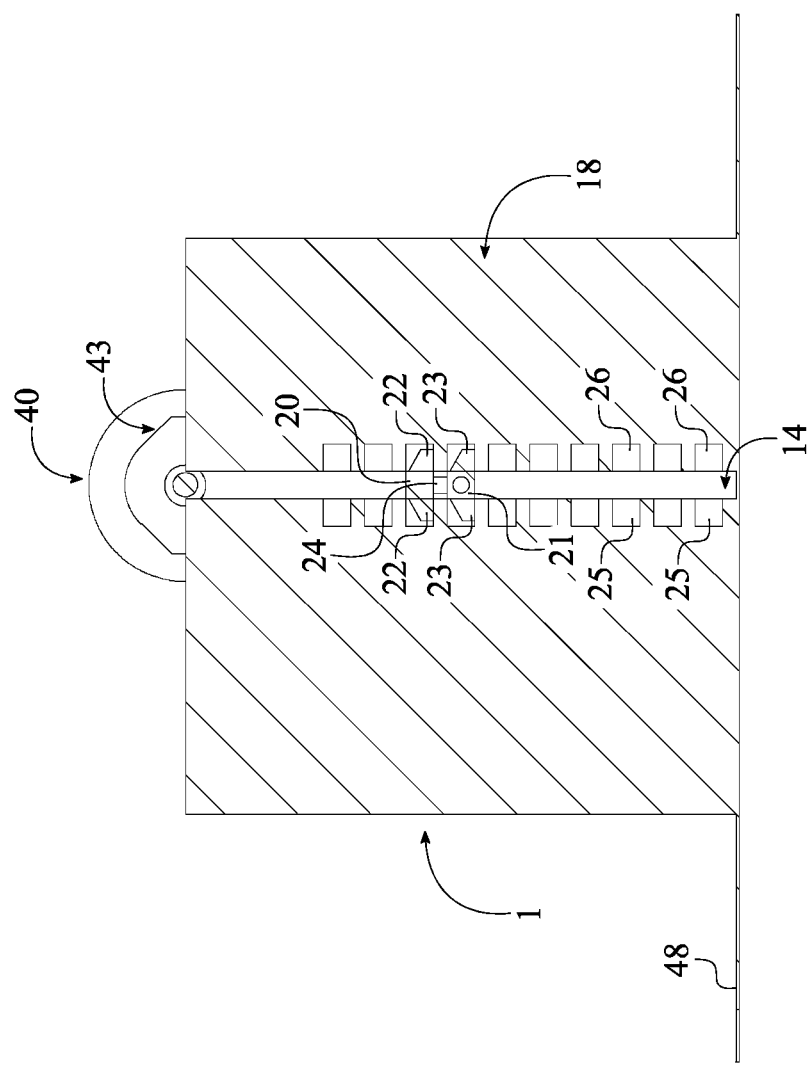
FIG. 11 is a cross section view taken along line 11-11 of FIG. 8, showing the subcomponents for the first embodiment of the underwater gate assembly.
Figure 12:
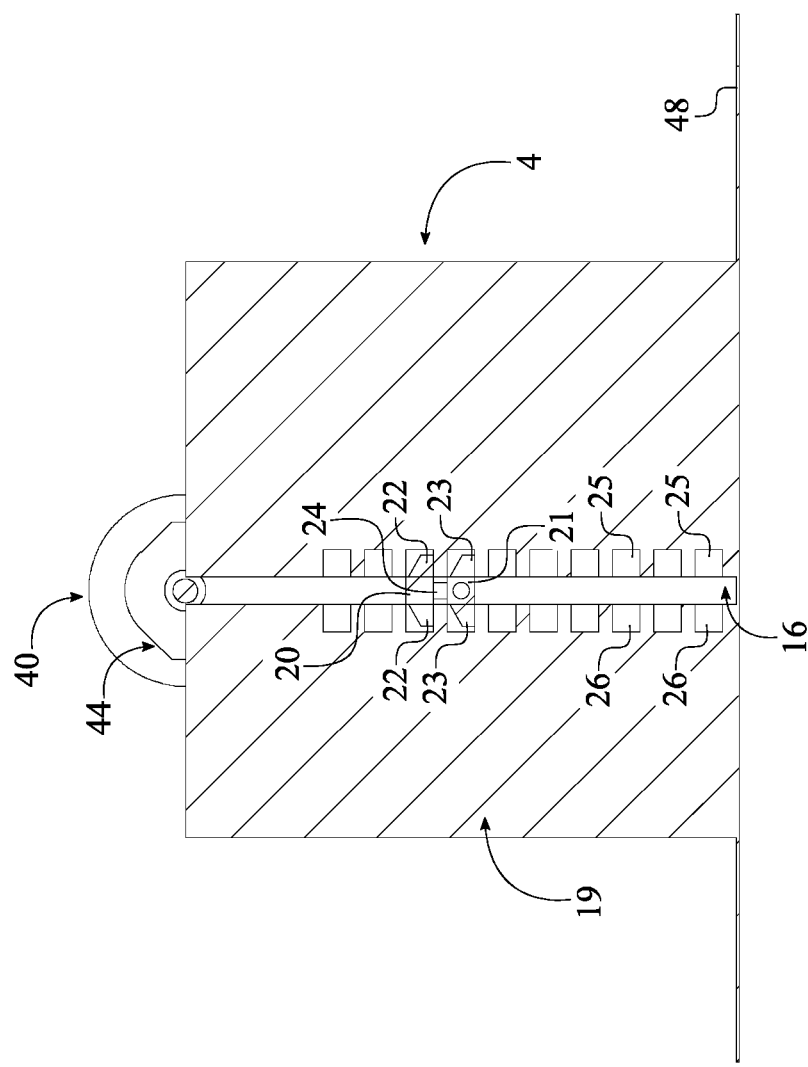
FIG. 12 is a cross section view taken along line 12-12 of FIG. 8, showing the subcomponents for the second embodiment of the underwater gate assembly.

Subcomponents of the first gate operational mechanism 18 and the second gate operational mechanism 19 describe here in after comprises a similar configuration as shown in FIG. 11-12. The upper slide block 20 is connected to the lower slide block 21 by the at least one hydraulic jack 24 so that the at least one hydraulic jack 24 can function as the inter-connecting operating member between the upper slide block 20 and the lower slide block 21. The upper retractable pin assembly 22 is integrated into the upper slide block 20 so that the upper retractable pin assembly 22 can engage or disengage the upper slide block 20 within the first vertical slot 14 and the second vertical slot 16. Similarly, the lower retractable pin assembly 23 is integrated into the lower slide block 21 so that the lower retractable pin assembly 23 can engage or disengage the lower slide block 21 within the first vertical slot 14 and the second vertical slot 16. In other words, the upper retractable pin assembly 22 and the lower retractable pin assembly 23 function as a locking keys wherein the upper retractable pin assembly 22 and the lower retractable pin assembly 23 engage with the plurality of left locking keys 25 and the plurality of right locking keys 26. More specifically, the upper retractable pin assembly 22 is selectively engaged with an upper corresponding pair keys from the plurality of left locking keys 25 and the plurality of right locking keys 26 thus locking the upper slide block 20. The lower retractable pin assembly 23 is selectively engaged with a lower corresponding pair keys from the plurality of left locking keys 25 and the plurality of right locking keys 26 thus locking the lower slide block 21. In other words, both the upper slide block 20 and the lower slide block 21 can be secured to the first channel wall 3 and the second channel wall 6 by the interlocking features between the upper retractable pin assembly 22, the lower retractable pin assembly 23, the plurality of left locking keys 25, and the plurality of right locking keys 26 with respect to the first gate operational mechanism 18 and the second gate operational mechanism 19.

Figure 13:
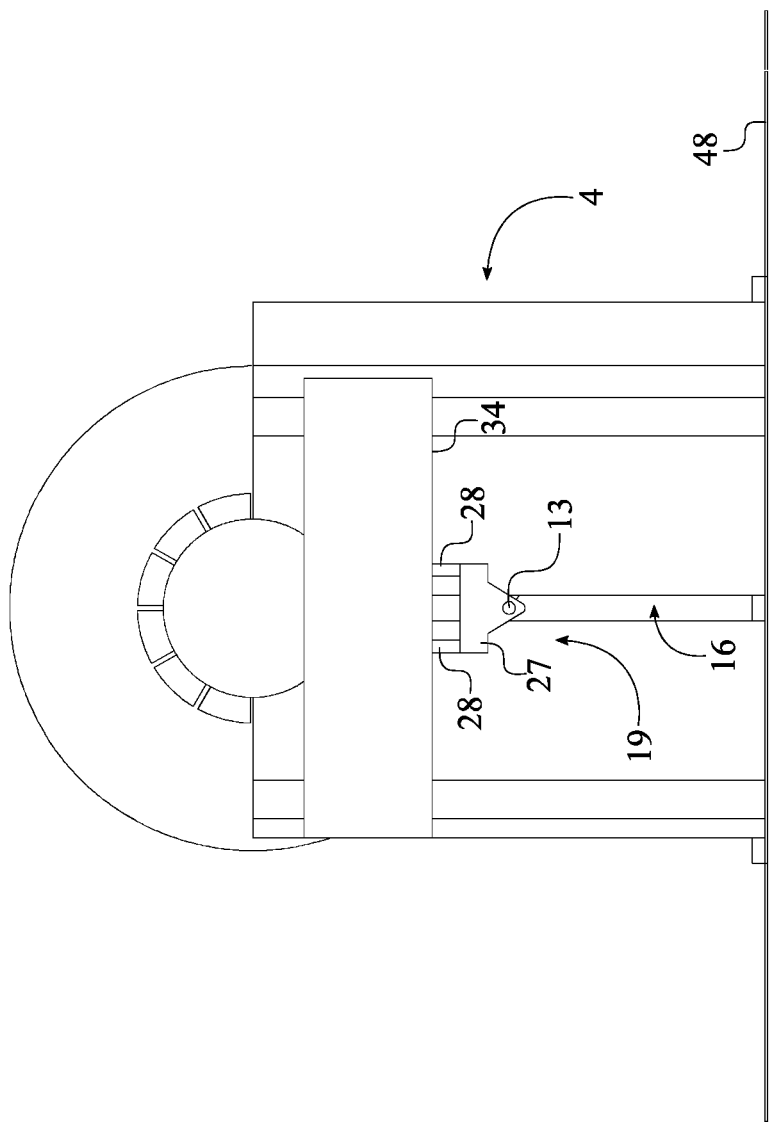
FIG. 13 is a side view of the present invention without the weir supported bridge and the channel support and bridge, showing the second embodiment of the second gate operational mechanism adjacent to the second L-shaped weir.
Figure 14:
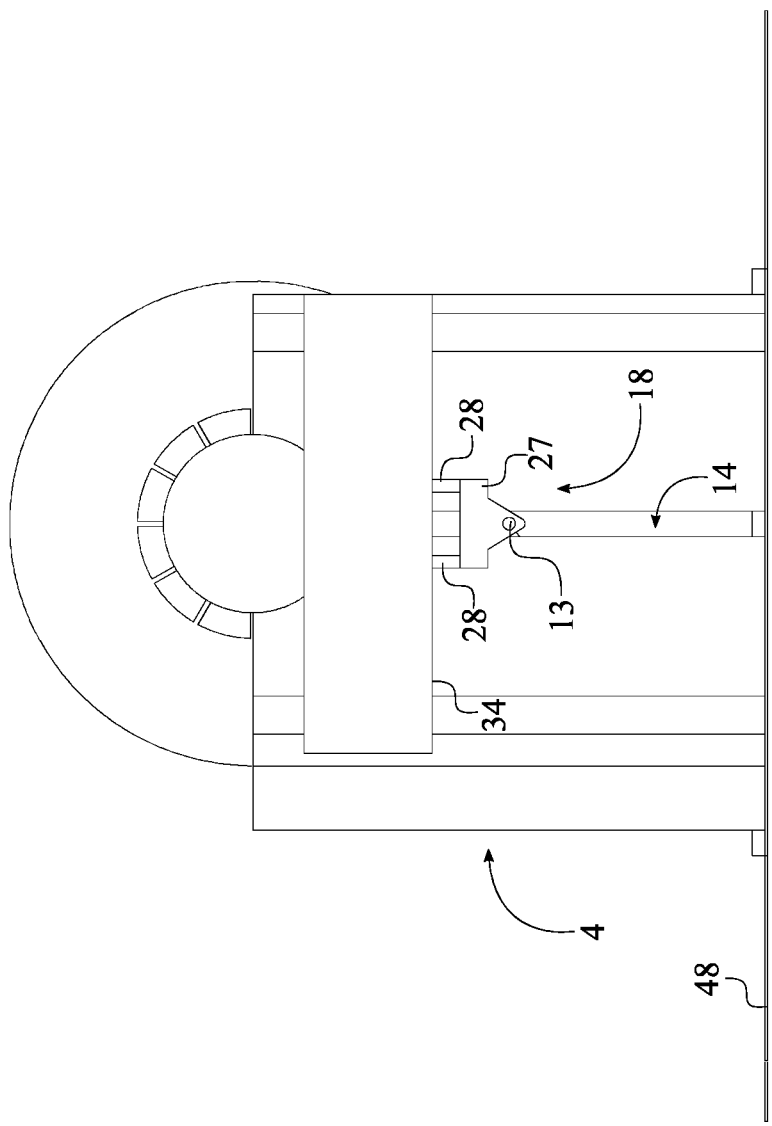
FIG. 14 is a side view of the present invention without the weir supported bridge and the channel support and bridge, showing the second embodiment of the first gate operational mechanism adjacent to the first L-shaped weir.

A second embodiment of the first gate operational mechanism 18 and the second gate operational mechanism 19 are configured similar to an inter-connected system. The functionality of the second embodiment of the first gate operational mechanism 18 and the second gate operational mechanism 19 directly depend upon the support and the operation of the elevation adjustable hydroelectric generator unit 29. In reference to FIG. 13-14, the second embodiment of the first gate operational mechanism 18 and the second gate operational mechanism 19 each comprises a connector block 27 and a supported jacking system 28. More specifically, the gate hinge 13 is rotatably connected within the connector block 27 of the first gate operational mechanism 18 and the connector block 27 of the second gate operational mechanism 19. With respect to the first vertical slot 14, the supported jacking system 28 of the first gate operational mechanism 18 is terminally mounted in between the connector block 27 of the first gate operational mechanism 18 and a bottom surface 34 for a hull 33 of the first jack-up barge 30. With respect to the second vertical slot 16, the supported jacking system 28 of the second gate operational mechanism 19 is terminally mounted in between the connector block 27 of the second gate operational mechanism 19 and a bottom surface 34 for the hull 33 of the second jack-up barge 31. As a result, the gate hinge 13 is rotatably positioned within the connector block 27 of the first gate operational mechanism 18 and the connector block 27 of the second gate operational mechanism 19 so that the top end 10 of the gate 9 can be vertically moved up and down along with the vertical movement of the first jack-up barge 30 and the second jack-up barge 31. Even though the supported jacking system 28 for the first gate operational mechanism 18 and the second gate operational mechanism 19 maintain a constant distance between the gate hinge 13 and the elevation adjustable hydroelectric generator unit 29 throughout the operation of the present invention, the supported jacking system 28 can also individually operate the positioning of the gate 9. For example, the supported jacking system 28 for the first gate operational mechanism 18 and the second gate operational mechanism 19 can lower the gate 9 against the subsurface environment 48 while the first jack-up barge 30 and the second jack-up barge 31 elevated above the body of water in order to protect the present invention from storm water damage or excessive water flow forces.

Figure 3:
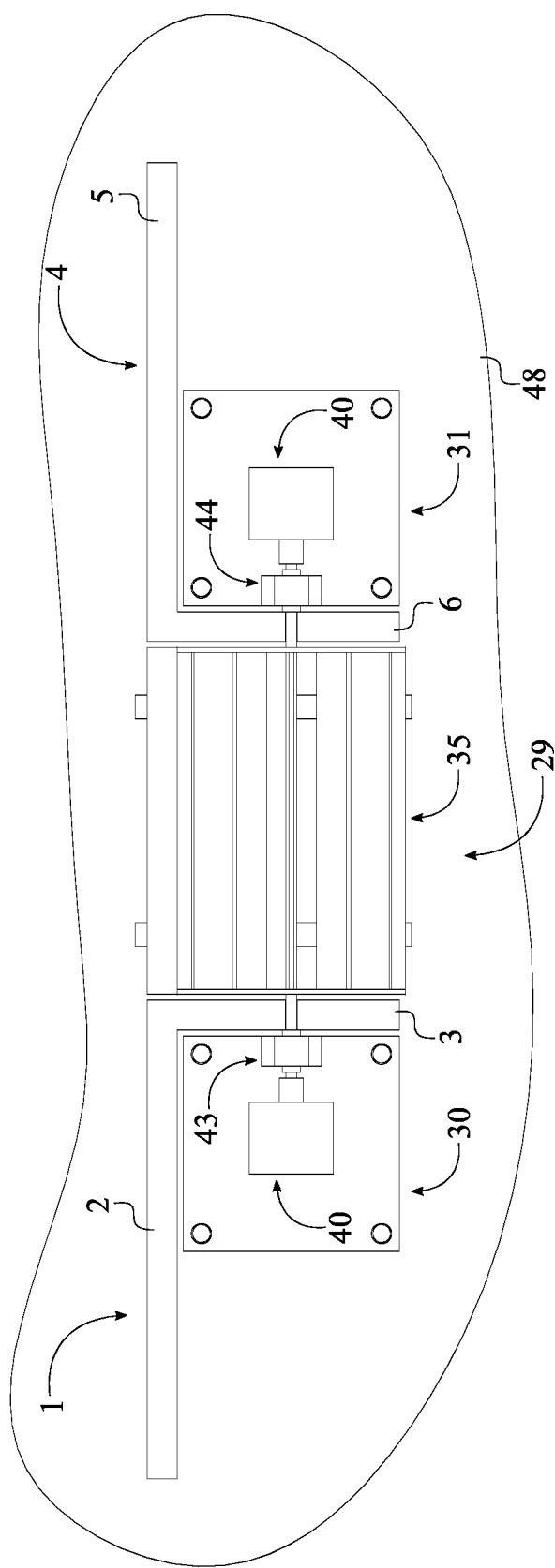
FIG. 3 is a top view of the present invention without the weir supported bridge and the channel support and bridge.
Figure 4:
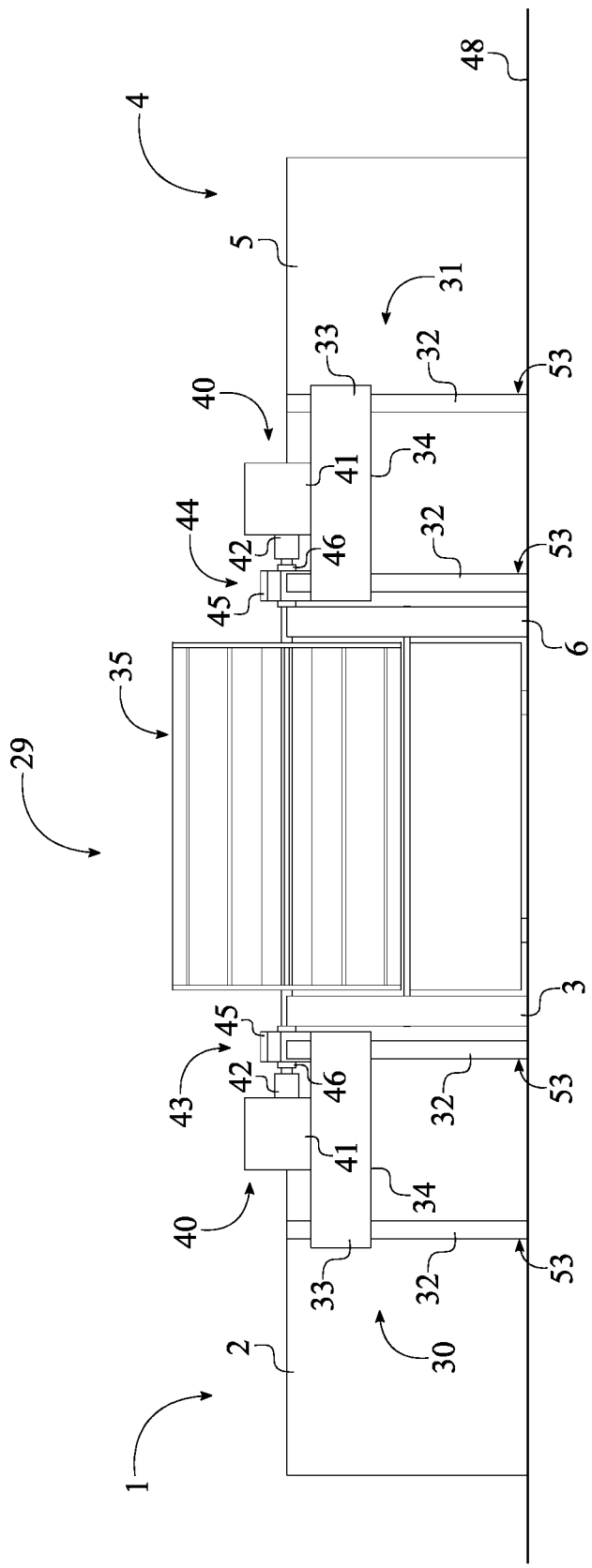
FIG. 4 is a side view of the present invention without the weir supported bridge and the channel support and bridge.

The elevation adjustable hydroelectric generator unit 29 that effectively harness the velocity of the water flow comprises a first jack-up barge 30, a second jack-up barge 31, the waterwheel 35, at least one generator 40, a first connector bearing 43, and a second connector bearing 44 as shown in FIG. 3-4. The first jack-up barge 30 and the second jack-up barge 31 are floated from their fabrication site to their installation site. At their installation site, the first jack-up barge 30 and the second jack-up barge 31 are jacked up to their final elevation and the waterwheel 35 is installed. The first jack-up barge 30 and the second jack-up barge 31 can be refloated at a later date for repairs, upgrades, etc. The first jack-up barge 30 and the second jack-up barge 31 do not depend on floatation to reach their final elevation. The first jack-up barge 30 and the second jack-up barge 31 float on top of the water level and are able to change elevation accurately and independently of the fluctuating water's surface elevation. More specifically, the first jack-up barge 30 and the second jack-up barge 31 are connected to the subsurface environment 48. In order to place the waterwheel 35 within the channel opening 7, the first jack-up barge 30 is positioned adjacent to the first L-shaped weir 1 and about the channel opening 7. The second jack-up barge 31 is positioned adjacent to the second L-shaped weir 4 and about the channel opening 7. As a result, the waterwheel 35 can be positioned within the channel opening 7 so that the waterwheel 35 is able to harness the velocity of the water flow. In reference to FIG. 4, the waterwheel 35 is rotatably mounted onto the first jack-up barge 30 through the first connector bearing 43 thus minimizing rotational friction. The waterwheel 35 is rotatably mounted onto the second jack-up barge 31 through the second connector bearing 44 so that the second connector bearing 44 is able to minimize rotational friction between the waterwheel 35 and the second jack-up barge 31. Since the first connector bearing 43 and the second connector bearing 44 are respectively positioned atop, adjacent to the channel opening 7, the first jack-up barge 30 and the second jack-up barge 31, sufficient room is left on top of the hull 33 for supporting equipment with adequate room between equipment for maintenance personal to easily access the equipment and the first connector bearing 43 and the second connector bearing 44 after the initial installation. The waterwheel 35 is symmetrically positioned across the channel opening 7 thus fully exposing the waterwheel 35 to the velocity of the waterflow. Furthermore, the waterwheel 35 is operatively coupled with the at least one generator 40 so that the rotational energy of the waterwheel 35 is able to rotate the at least one generator 40 thus generating electrical energy.

In reference to FIG. 4-5, the first jack-up barge 30 and the second jack-up barge 31 each comprises a plurality of legs 32 and the hull 33. More specifically, the plurality of legs 32 is perimetrically positioned around the hull 33 and slidably traverses through the hull 33. The hull 33 is preferably formed into a rectangular shape body so that the plurality of legs 32 can traverse through each corner of the rectangularly shaped hull 33. Furthermore, an anchoring end 53 of each leg is connected to the subsurface environment 48 as a free end of each leg traverses through and extends above the hull 33. As a result, the hull 33 is able to vertically slide up and down along the plurality of legs 32 according to the water level. The vertical sliding process of the hull 33 is preferably implemented through a hydraulic jack system that is integrated around the plurality of legs 32 so that the hull 33 can always remain horizontal and so that both barges can be maintained at the same elevation. In reference to FIG. 16-18, an outer support sleeve 45 of the first connector bearing 43 is adjacently connected onto the hull 33 of the first jack-up barge 30 thus providing a fixed position for the first connector bearing 43. Similarly, an outer support sleeve 45 of the second connector bearing 44 is adjacently connected onto the hull 33 of the second jack-up barge 31 thus providing a fixed position for the second connector bearing 44. Furthermore, the jacking system of the first jack-up barge 30 and the second jack-up barge 31 are able to lift the hull 33 and all of its equipment including the waterwheel 35, the at least one generator 40, the first connector bearing 43, and the second connector bearing 44 high enough to avoid storm water damage through the hydraulic jack system that is utilized for raising and lowering the first jack-up barge 30 and the second jack-up barge 31. For example, when the water flow is excessive and flows over the first L-shaped weir 1 and the second L-shaped weir 4, the first jack-up barge 30 and the second jack-up barge 31 can be kept at their desire elevation thus suspending the operation of the present invention. However, raising and lowering of the first jack-up barge 30 and the second jack-up barge 31 can be accomplished using many possible methods known to those who are familiar with the art. In addition to the operation of the first jack-up barge 30 and the second jack-up barge 31, the present invention can also utilize other optional methods of laterally supporting the first jack-up barge 30 and the second jack-up barge 31 by the first L-shaped weir 1 and the second L-shaped weir 4 such as the use of adjustable shims and in the process reducing the first jack-up barge 30 and the second jack-up barge 31 vibration.

Figure 15:
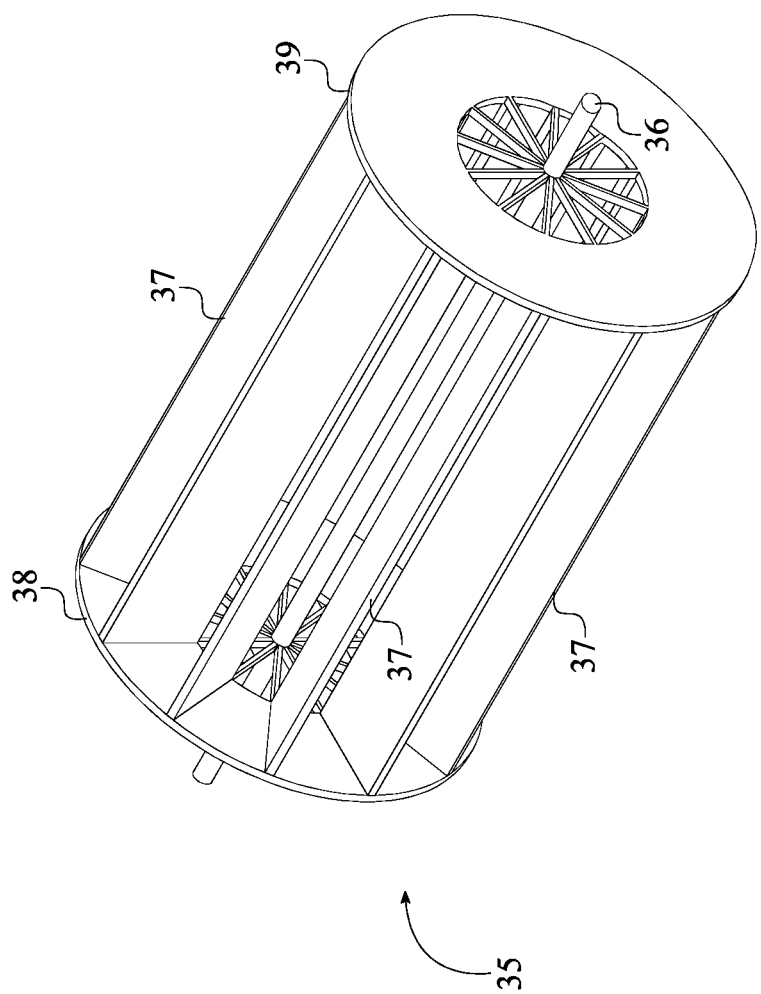
FIG. 15 is a perspective view of the waterwheel of the present invention.

The waterwheel 35 is large in diameter and uses wide, deep high drag coefficient paddles. A plurality of paddle boards 37 of the waterwheel 35 turns very close to the channel opening 7 and the gate 9 maximizing the efficiency of the present invention. In reference to FIG. 15, the waterwheel 35 comprises a main axle 36, the plurality of paddle boards 37, a first annular connector 38, and a second annular connector 39. The plurality of paddle boards 37 that comes into the contact with the water flow is radially distributed around the main axle 36. When the water flow is guided through the channel opening 7, the plurality of paddle boards 37 is able to continuously harvest the kinetic energy of the flowing water since each of the plurality of paddle boards 37 has a high drag coefficient upstream surface. Furthermore, the plurality of paddle boards 37 is equally spaced apart from each other and terminally connected to the main axle 36 by the first annular connector 38 and the second annular connector 39. More specifically, redirection of the flowing water to the channel opening 7 and the installation of the waterwheel 35 cause the water depth on the upstream side of the first weir wall 2 and the second weir wall 5 to increase. The water pressure on the on the plurality of paddle boards 37 then increases the water flow rate through the channel opening 7, thus making direct contact with the plurality of paddle boards 37. Simultaneously, the water depth below the lowest point of the plurality of paddle boards 37 is maintained above the downstream body of water and eliminating any turning resistance from the downstream body of water that may apply on the waterwheel 35. In other words, the terminal positioning of the first annular connector 38 and the second annular connector 39 enable the full length of each of paddle board to directly absorb the velocity of the water flow without any turbulence. Furthermore, at least two paddles from the plurality of paddle boards 37 are always submerge in the flowing water insuring continuous rotation of the waterwheel 35.

In reference to FIG. 6, the main axle 36 terminally traversing/extends through the first vertical slot 14 and the second vertical slot 16 of the underwater gate assembly 8 so that the main axle 36 is able to vertically move up and down without interfering with the first channel wall 3 and the second channel wall 6. The first vertical slot 14 and the second vertical slot 16 can optionally employ a water seal that prevents water movement through the first channel wall 3 and the second channel wall 6 to ease the vertical movement of the gate hinge 13 and the main axle 36. In a preferred embodiment of the present invention, shown in FIG. 16-18, an inner support sleeve 46 of the first connector bearing 43 is axially connected around the main axle 36 so that the main axle 36 can be connected to the first jack-up barge 30 about the first vertical slot 14. An inner support sleeve 46 of the second connector bearing 44 is axially connected around the main axle 36 so that the main axle 36 can be connected to the second jack-up barge 31 about the second vertical slot 16.

Figure 17:
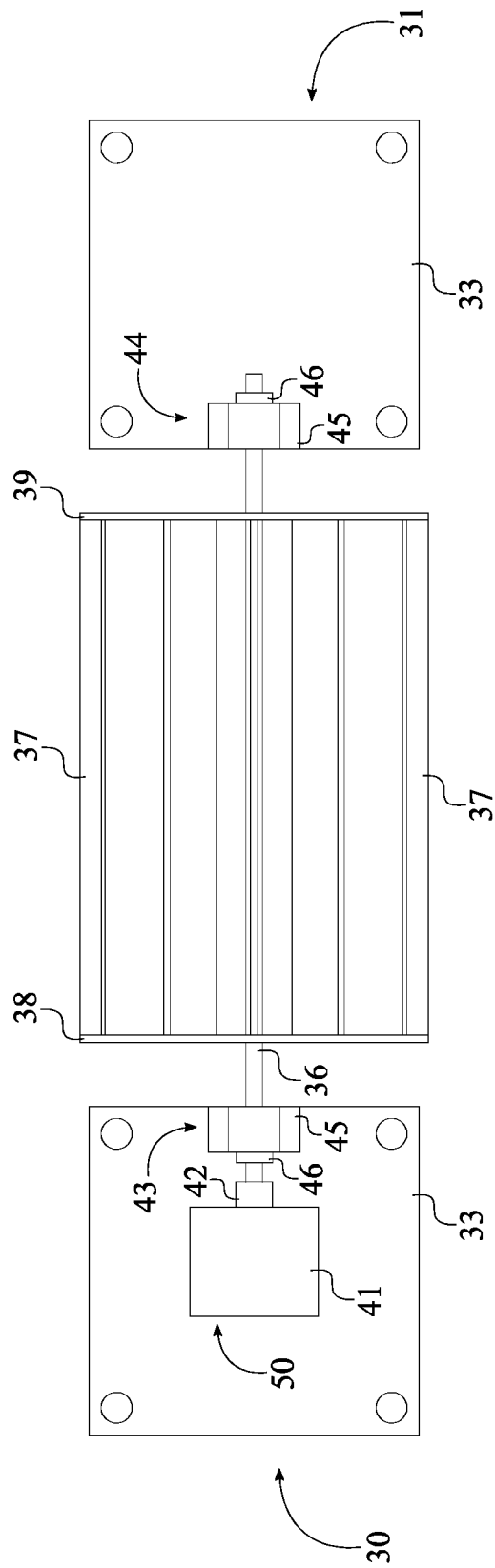
FIG. 17 is a top view of the present invention without the weir supported bridge and the channel support and bridge, showing the connection of the single generator unit adjacent to the first jack-up barge.

In reference to FIG. 17, the at least one generator 40 can be a single generator unit 50 within a first embodiment of the present invention and is positioned adjacent and supported on the first jack-up barge 30. More specifically, a stator 41 of the single generator unit 50 is adjacently connected onto the hull 33 of the first jack-up barge 30 so that the single generator unit 50 can be secured within the present invention. A rotor 42 of the single generator unit 50 is operatively coupled with the main axle 36 as the first connector bearing 43 is positioned in between the single generator unit 50 and the first annular connector 38. Preferably, the main axle 36 is axially connected to the rotor 42 of the single generator unit 50. However, the main axle 36 can be indirectly and operatively coupled to the rotor 42 of the single generator unit 50 through a gearbox system, a hydraulic system, or a belt system that is positioned adjacent to the first jack-up barge 30.

Figure 18:
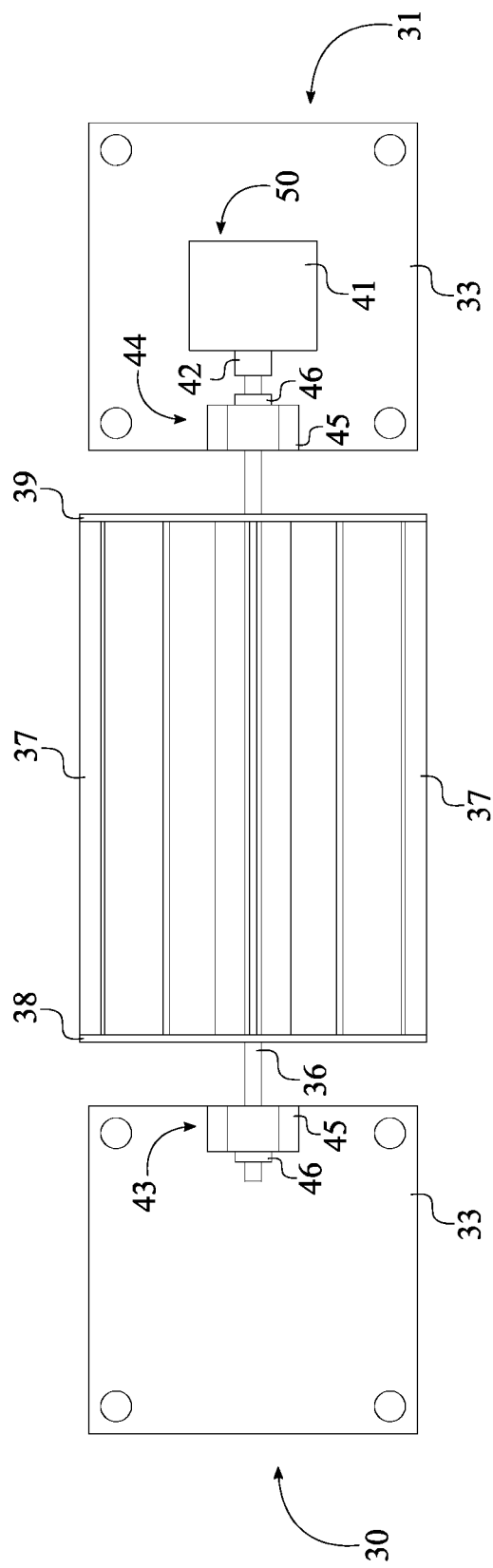
FIG. 18 is a top view of the present invention without the weir supported bridge and the channel support and bridge, showing the connection of the single generator unit adjacent to the second jack-up barge.

In reference to FIG. 18, the at least one generator 40 can be a single generator unit 50 within a second embodiment of the present invention and is positioned adjacent to the second jack-up barge 31. More specifically, a stator 41 of the single generator unit 50 is adjacently connected onto the hull 33 of the second jack-up barge 31 so that the single generator unit 50 can be secured within the present invention. A rotor 42 of the single generator unit 50 is operatively coupled with the main axle 36 as the second connector bearing 44 is positioned in between the single generator unit 50 and the second annular connector 39. Preferably, the main axle 36 is axially connected to the rotor 42 of the single generator unit 50. However, the main axle 36 can be indirectly and operatively coupled to the rotor 42 of the single generator unit 50 through a gearbox system, a hydraulic system, or a belt system that is positioned adjacent to the second jack-up barge 31.

Figure 16:
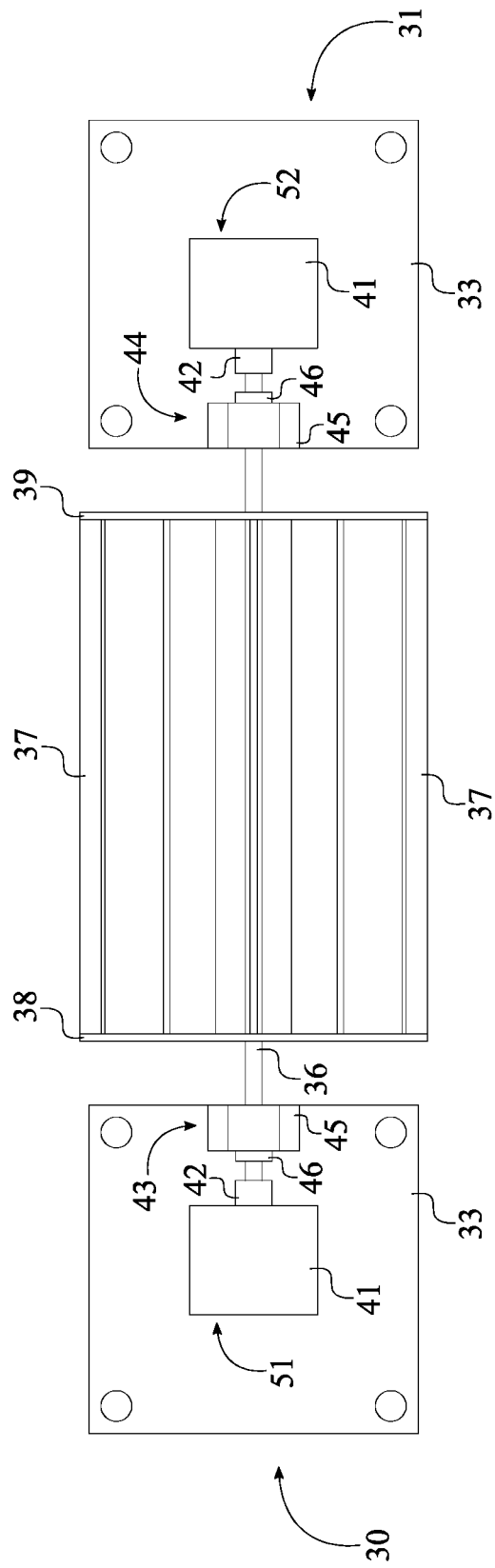
FIG. 16 is a top view of the present invention without the weir supported bridge and the channel support and bridge, showing the connection of multiple generators.

In reference to FIG. 16, the at least one generator 40 can be multiple generators within a third embodiment of the present invention as the at least one generator 40 comprises a first generator unit 51 and a second generator unit 52. More specifically, the first generator unit 51 is positioned adjacent to the first jack-up barge 30, and the second generator unit 52 is positioned adjacent to the second jack-up barge 31. A stator 41 of the first generator unit 51 is adjacently connected onto the hull 33 of the first jack-up barge 30 so that the first generator unit 51 can be secured within the present invention. A rotor 42 of the first generator unit 51 is operatively coupled with the main axle 36 as the first connector bearing 43 is positioned in between the first generator unit 51 and the first annular connector 38. Similarly, A stator 41 of the second generator unit 52 is adjacently connected onto the hull 33 of the second jack-up barge 31 so that the second generator unit 52 can be secured within the present invention. A rotor 42 of the second generator unit 52 is operatively coupled with the main axle 36 as the second connector bearing 44 is positioned in between the second generator unit 52 and the second annular connector 39. Preferably, the main axle 36 is axially connected to the rotor 42 of the first generator unit 51 and the second generator unit 52. However, the main axle 36 can be indirectly and operatively coupled to the rotor 42 of the first generator unit 51 and the second generator unit 52 through gearbox systems, hydraulic systems, or belt systems that are positioned adjacent to the first jack-up barge 30 and the second jack-up barge 31.

Optionally, at least one waterproof enclosure can cover the at least one generator 40, the first connector bearing 43, and the second connector bearing 44 and provides an optimum working space for maintenance of the at least one generator 40, the first connector bearing 43, and the second connector bearing 44. The waterproof enclosure also reduces equipment humidity and corrosion thus maximizing the equipment's operational life and operational up time. The waterproof enclosure also maintains a safe, well lighted, pleasant working environment for the crew.

Figure 8:
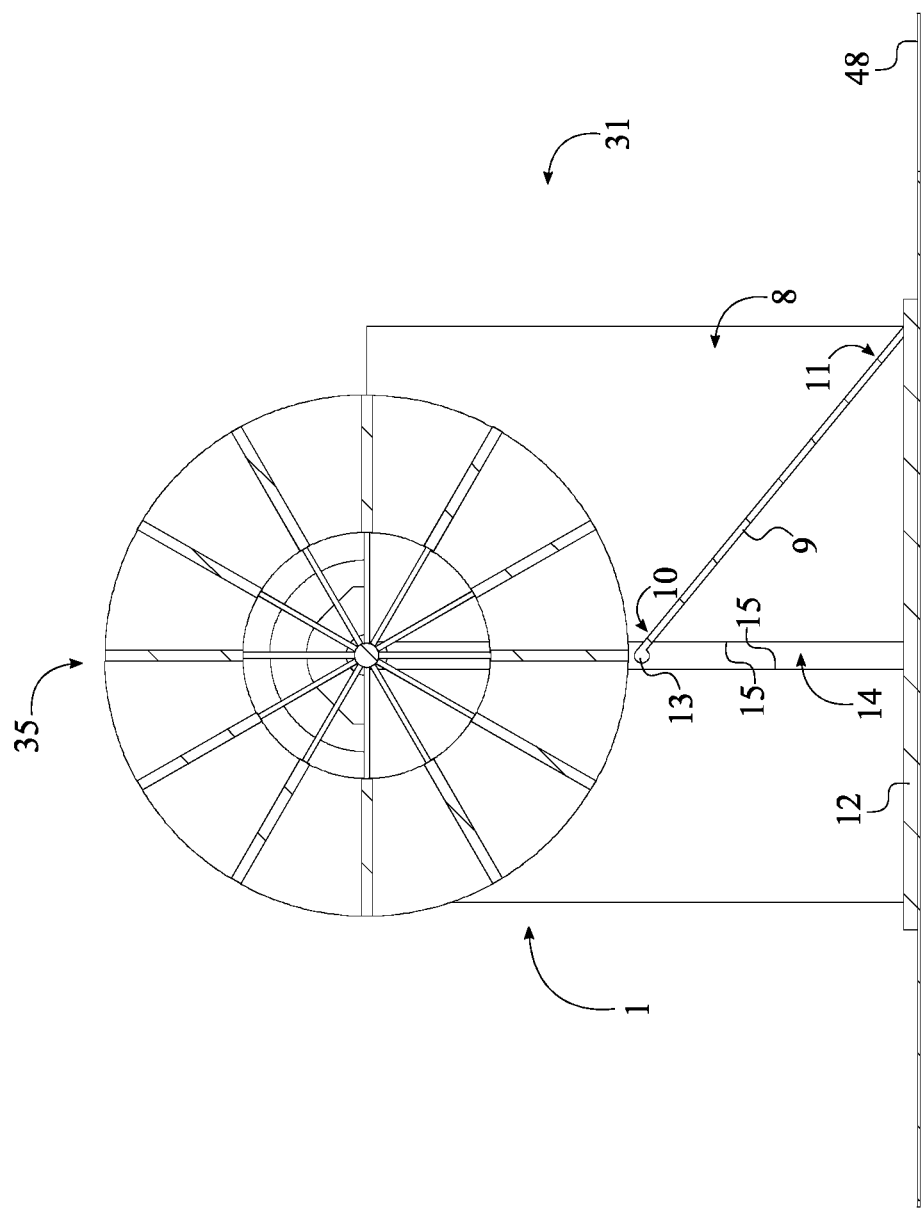
FIG. 8 is a cross section view taken along line 8-8 of FIG. 8, showing the component of the underwater gate assembly.

In reference to FIG. 8, when the water flow is unidirectional tidal flow, the at least one gate 9 is a single gate 9 within the present invention so that the water flow can be gradually glide over the single gate 9 and intersect with the plurality of paddle boards 37. Furthermore, an upstream side of the plurality of paddle boards 37 has a high drag coefficient surface to collect the highest possible water force on each paddle board 37 and for the plurality of paddle boards 37 to transfer the highest possible torque to the waterwheel 35 and in turn transfer that torque to the at least one generator 40.

In reference to FIG. 16, when the water flow is bi-directional tidal flow, the at least one gate 9 is a pair of gates within the present invention so that the water flow can be gradually glide over a corresponding gate 9 from the pair of gates from each flow direction and intersect with the plurality of paddle boards 37. Furthermore, both upstream sides and downstream sides of the plurality of paddle boards 37 have high drag coefficient surfaces to achieve maximum torque on the waterwheel 35. In other words, the plurality of paddle boards 37 does not have to change orientation upon the direction of the water flow to impose similar torque to the waterwheel 35. The waterwheel 35 turns in one direction for incoming tidal flow and in the opposite direction for outgoing tidal flow. Many methods that are known to people familiar with the art, which allow the at least one generator 40 to continuously generate electricity when its driver, the waterwheel 35 reverses its direction of rotation, including the use of gears, bi-directional generators, etc.

The present invention can utilize optional methods to ensure that maximum velocity of water flow is directed to the plurality of paddle boards 37 with the least flowing velocity and flowing pressure losses. These methods can include, but are not limited to, the use of hinged plates (under waterwheel gates) under the waterwheel 35 that change elevation as the waterwheel 35 changes elevation.

Figure 19:
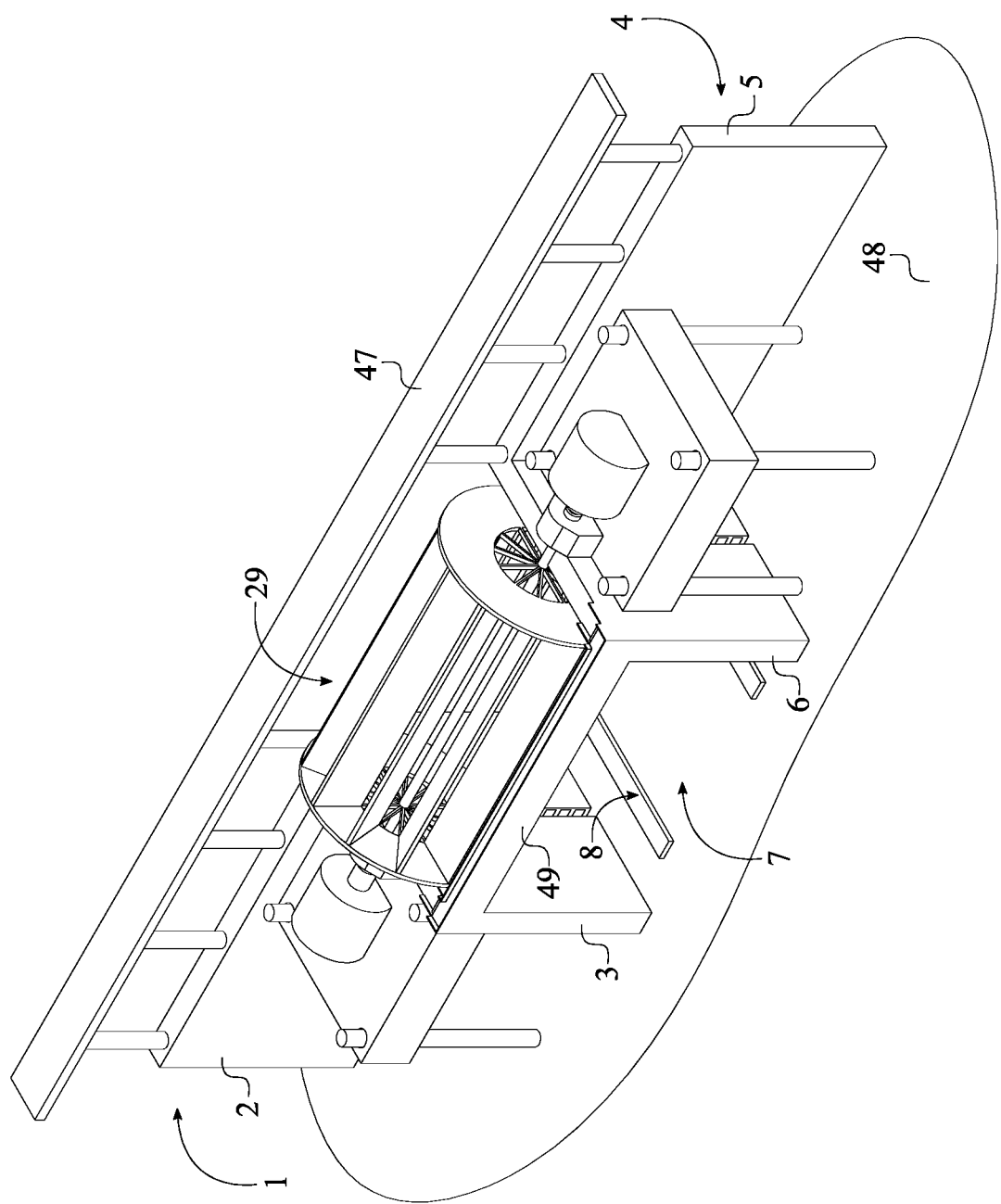
FIG. 19 is a perspective view of the present invention with the weir supported bridge and the channel support and bridge.
Figure 20:
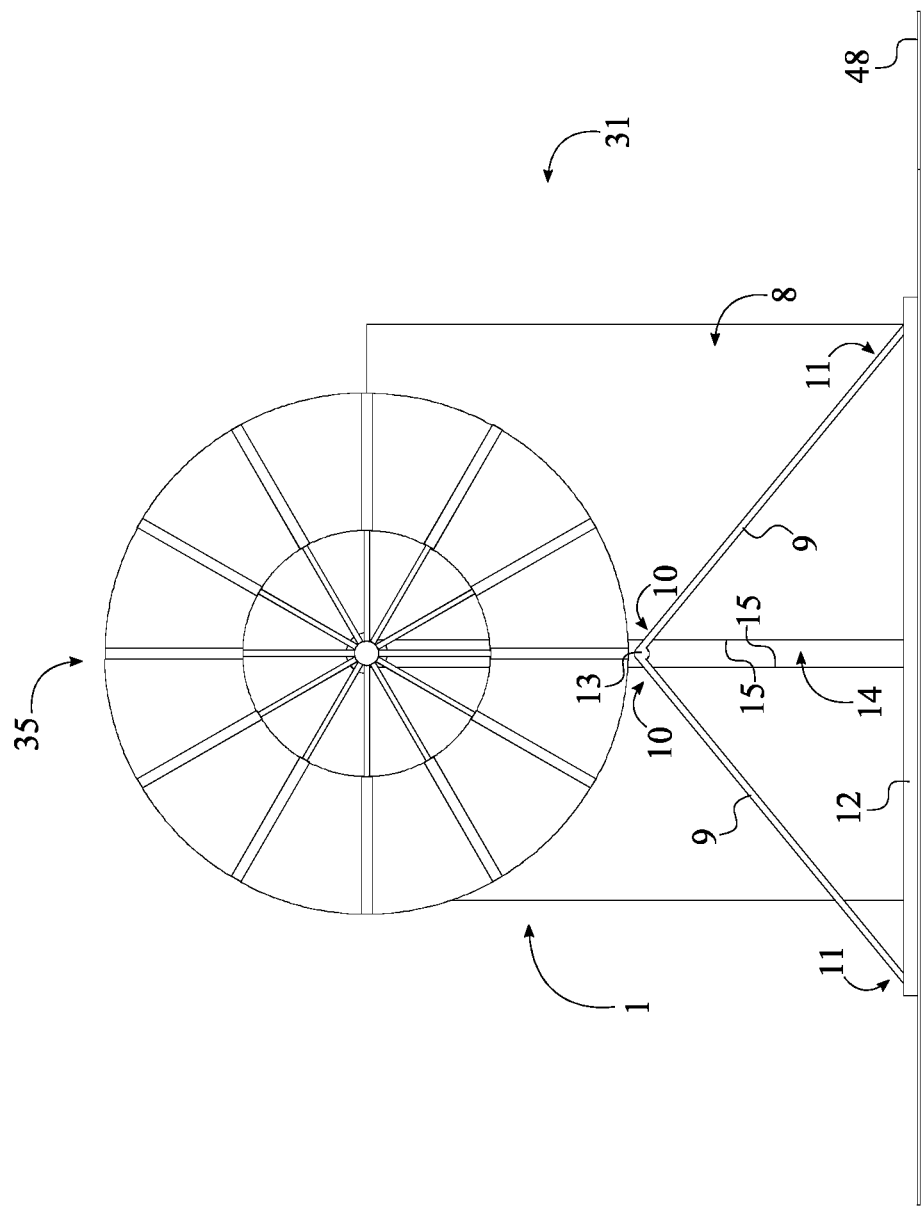
FIG. 20 is a schematic view of the present invention, showing the at least one gate being a pair of gates.

The present invention optionally comprises a weir supported bridge 47 as shown in FIG. 19. The weir supported bridge 47 is linearly connected along the first weir wall 2 of the first L-shaped weir 1 and the second weir wall 5 of the second L-shaped weir 4 so that the weir supported bridge 47 can be extended across and atop the body of water. For example, The weir supported bridge 47 can be of any form and combined with the community's desire to blend in with the environment and to benefit the community in many ways including providing a pedestrian bridge, a car bridge, a hike and bike bridge or some combination of these across the river or stream, a fish farm, a fishing pier, an electrical cable extension bridge, etc.

The present invention optionally comprises a channel support and bridge 49 as shown in FIG. 19. The channel support and bridge 49 is linearly connected from the first channel wall 3 of the first L-shaped weir 1 to the second channel wall 6 of the second L-shaped weir 4 so that the channel support and bridge 49 can be extended across the channel opening 7. The structural support of the first channel wall 3, the second channel wall 6, and the channel support and bridge 49 primarily and laterally supports the top of the first channel wall 3 and the second channel wall 6 from the hydrostatic pressure, but also optionally provides support of a personnel bridge across the channel opening 7.

Although the invention has been explained in relation to its preferred embodiment, it is to be understood that many other possible modifications and variations can be made without departing from the spirit and scope of the invention as hereinafter claimed.

What is claimed is:

1. A water current catcher system for hydroelectricity generation comprises:
    a first L-shaped weir;
    a second L-shaped weir;
    a channel opening;
    an underwater gate assembly;
    at least one elevation adjustable hydroelectric generator unit;
    the first L-shaped weir and the second L-shaped weir being connected to a subsurface environment;
    the first L-shaped weir and the second L-shaped weir being linearly positioned adjacent to each other;
    the channel opening being delineated in between the first L-shaped weir and the second L-shaped weir;
    the underwater gate assembly being integrated into the first L-shaped weir, the second L-shaped weir, and the subsurface environment;
    the underwater gate assembly being extended across the channel opening;
    the elevation adjustable hydroelectric generator unit being connected to the subsurface environment;
    the elevation adjustable hydroelectric generator unit being mounted across the first L-shaped weir and the second L-shaped weir;
    the elevation adjustable hydroelectric generator unit being operatively coupled with the underwater gate assembly, wherein the elevation adjustable hydroelectric generator unit converts a kinetic energy of a water flow to hydroelectricity;
    the elevation adjustable hydroelectric generator unit comprises a first jack-up barge, a second jack-up barge, a waterwheel, at least one generator, a first connector bearing, and a second connector bearing;
    the first jack-up barge and the second jack-up barge being connected to the subsurface environment;
    the first jack-up barge being positioned adjacent to the first L-shaped weir about the channel opening;
    the second jack-up barge being positioned adjacent to the second L-shaped weir about the channel opening;
    the waterwheel being rotatably mounted onto the first jack-up barge through the first connector bearing;
    the waterwheel being rotatably mounted onto the second jack-up barge through the second connector bearing;
    the waterwheel being symmetrically positioned across the channel opening;
    the waterwheel being operatively coupled with the at least one generator, wherein the rotation energy of the waterwheel rotates the at least one generator;
    the underwater gate assembly comprises at least one gate, a track system, a gate hinge, a first vertical slot, a second vertical slot, a first gate operational mechanism, and a second gate operational mechanism;
    the gate hinge being rotatably connected to a top end of the gate;
    the track system being connected to the subsurface environment;
    a bottom end of the gate being slidably engaged with the track system, opposite of the subsurface environment;
    the first vertical slot traversing through a first channel wall of the first L-shaped weir;
    the first vertical slot being oriented parallel to a first weir wall of the first L-shaped weir;
    the second vertical slot traversing through a second channel wall of the second L-shaped weir;
    the second vertical slot being oriented parallel to a second weir wall of the second L-shaped weir;
    the first vertical slot and the second vertical slot being positioned parallel to each other;
    the gate hinge being slidably engaged with the first vertical slot and the second vertical slot;
    the first gate operational mechanism being positioned adjacent to the first vertical slot;

the second gate operational mechanism being positioned adjacent to the second vertical slot; and the gate hinge being operatively coupled with the first gate operational mechanism and the second gate operational mechanism, wherein the top end of the gate vertically moves along the first vertical slot and the second vertical slot by the first gate operational mechanism and the second gate operational mechanism.

2. The water current catcher system for hydroelectricity generation as claimed in claim 1 comprises:

the first L-shaped weir comprises a first weir wall and a first channel wall;

the second L-shaped weir comprises a second weir wall and a second channel wall;

the first weir wall and the first channel wall being terminally connected to each other;

the second weir wall and the second channel wall being terminally connected to each other;

the first weir wall and the second weir wall being positioned coplanar to each other;

the first channel wall and the second channel wall being positioned parallel to each other; and the channel opening being delineated in between the first channel wall and the second channel wall.

3. The water current catcher system for hydroelectricity generation as claimed in claim 1 comprises:

the first gate operational mechanism and the second gate operational mechanism each comprises an upper slide block, a lower slide block, an upper retractable pin assembly, a lower retractable pin assembly, at least one hydraulic jack, a plurality of left locking keys, and a plurality of right locking keys;

the lower slide block and the upper slide block for the first gate operational mechanism being slidably engaged within the first vertical slot;

the lower slide block and the upper slide block for the second gate operational mechanism being slidably engaged within the second vertical slot;

the gate hinge being rotatably connected within the lower slide block of the first gate operational mechanism and the lower slide block of the second gate operational mechanism;

the plurality of left locking keys and the plurality of right locking keys of the first gate operational mechanism being integrated into opposing walls of the first vertical slot; and the plurality of left locking keys and the plurality of right locking keys of the second gate operational mechanism being integrated into opposing walls of the second vertical slot.

4. The water current catcher system for hydroelectricity generation as claimed in claim 3 comprises:

the upper slide block being connected to the lower slide block by the at least one hydraulic jack;

the upper retractable pin assembly being integrated into the upper slide block;

the lower retractable pin assembly being integrated into the lower slide block;

the upper retractable pin assembly being selectively engaged with an upper corresponding pair keys from the plurality of left locking keys and the plurality of right locking keys; and the lower retractable pin assembly being selectively engaged with a lower corresponding pair keys from the plurality of left locking keys and the plurality of right locking keys.

5. The water current catcher system for hydroelectricity generation as claimed in claim 1 comprises:

the first gate operational mechanism and the second gate operational mechanism each comprises a connector block and a supported jacking system;

the elevation adjustable hydroelectric generator unit comprises a first jack-up barge and a second jack-up barge;

the first jack-up barge and the second jack-up barge each a hull;

the gate hinge being rotatably connected within the connector block of the first gate operational mechanism and the connector block of the second gate operational mechanism;

the supported jacking system of the first gate operational mechanism being terminally mounted in between the connector block of the first gate operational mechanism and a bottom surface for the hull of the first jack-up barge; and the supported jacking system of the second gate operational mechanism being terminally mounted in between the connector block of the second gate operational mechanism and a bottom surface for the hull of the second jack-up barge.

6. The water current catcher system for hydroelectricity generation as claimed in claim 1 comprises:

the first jack-up barge and the second jack-up barge each comprises a plurality of legs and a hull;

the plurality of legs being perimetrically positioned around the hull;

the plurality of legs slidably traversing through the hull;

an anchoring end of each leg being connected to the subsurface environment;

an outer support sleeve of the first connector bearing being adjacently connected onto the hull of the first jack-up barge; and an outer support sleeve of the second connector bearing being adjacently connected onto the hull of the second jack-up barge.

7. The water current catcher system for hydroelectricity generation as claimed in claim 1 comprises:

the waterwheel comprises a main axle, a plurality of paddle boards, a first annular connector, and a second annular connector;

the plurality of paddle boards being radially distributed around the main axle;

the plurality of paddle boards being equally spaced apart from each other;

the plurality of paddle boards being terminally connected to the main axle by the first annular connector and the second annular connector;

the main axle terminally traversing through a first vertical slot and a second vertical slot of the underwater gate assembly;

an inner support sleeve of the first connector bearing being axially connected around the main axle about the first vertical slot; and an inner support sleeve of the second connector bearing being axially connected around the main axle about the second vertical slot.

8. The water current catcher system for hydroelectricity generation as claimed in claim 1 comprises:

the at least one generator being a single generator unit;

the single generator unit being positioned adjacent to the first jack-up barge;

a stator of the single generator unit being adjacently connected onto a hull of the first jack-up barge; and a rotor of the single generator unit being operatively coupled with a main axle of the waterwheel.

9. The water current catcher system for hydroelectricity generation as claimed in claim 1 comprises:
the at least one generator being a single generator unit;
the single generator unit being positioned adjacent to the second jack-up barge;
a stator of the single generator unit being adjacently connected onto a hull of the second jack-up barge; and
a rotor of the single generator unit being operatively coupled with a main axle of the waterwheel.

10. The water current catcher system for hydroelectricity generation as claimed in claim 1 comprises:
the at least one generator comprises a first generator unit and a second generator unit;
the first generator unit being positioned adjacent to the first jack-up barge;
the second generator unit being positioned adjacent to the second jack-up barge;
a stator of the first generator unit being adjacently connected onto a hull of the first jack-up barge;
a rotor of the first generator unit being operatively coupled with a main axle of the waterwheel;
a stator of the second generator unit being adjacently connected onto a hull of the second jack-up barge; and
a rotor of the second generator unit being operatively coupled with the main axle of the waterwheel, opposite of the rotor of the first generator unit.

11. The water current catcher system for hydroelectricity generation as claimed in claim 1 comprises:
a weir supported bridge; and
the weir supported bridge being linearly connected along a first weir wall of the first L-shaped weir and a second weir wall of the second L-shaped weir.

12. The water current catcher system for hydroelectricity generation as claimed in claim 1 comprises:
a channel support and bridge; and
the channel support and bridge being linearly connected from a first channel wall of the first L-shaped weir to a second channel wall of the second L-shaped weir.

* * * * *